United States Patent [19]

Rees et al.

[11] Patent Number: 5,748,878
[45] Date of Patent: May 5, 1998

[54] METHOD AND APPARATUS FOR ANALYZING SOFTWARE EXECUTED IN EMBEDDED SYSTEMS

[75] Inventors: Andrew John Rees, Seattle; Stephen Caine O'Brien, Redmond; Peter D. Krystad, Seattle, all of Wash.

[73] Assignee: Applied Microsystems, Inc., Redmond, Wash.

[21] Appl. No.: 526,709

[22] Filed: Sep. 11, 1995

[51] Int. Cl.$^6$ ................................................. G06F 11/00
[52] U.S. Cl. .............. 395/183.14; 364/267; 364/267.91; 395/704
[58] Field of Search .................... 395/183.14, 183.15, 395/183.21, 500, 704, 708; 364/267, 267.91

[56] References Cited

U.S. PATENT DOCUMENTS

| | | | |
|---|---|---|---|
| 4,144,493 | 3/1979 | Lee et al. | 324/158 |
| 4,445,192 | 4/1984 | Haag | 364/900 |
| 4,590,581 | 5/1986 | Widdoes, Jr. | 364/578 |
| 4,720,778 | 1/1988 | Hall et al. | 364/200 |
| 4,811,345 | 3/1989 | Johnson | 371/16 |
| 4,819,233 | 4/1989 | Delvcia | 395/183.14 |
| 4,845,615 | 7/1989 | Blasciak | 364/200 |
| 4,849,879 | 7/1989 | Chinnaswamy et al. | 364/200 |
| 4,864,569 | 9/1989 | DeLucia et al. | 371/19 |
| 4,937,740 | 6/1990 | Agarwal | 364/200 |
| 4,969,148 | 11/1990 | Nadeau-Dostie et al. | 371/21.1 |
| 4,989,134 | 1/1991 | Shaw | 364/200 |
| 5,006,992 | 4/1991 | Skeirik | 364/513 |
| 5,047,919 | 9/1991 | Sterling | 364/200 |
| 5,062,055 | 10/1991 | Chinnaswamy et al. | 364/513 |
| 5,103,394 | 4/1992 | Blasciak | 395/184.01 |
| 5,121,501 | 6/1992 | Baumgartner | 395/183.14 X |
| 5,136,590 | 8/1992 | Polstra et al. | 371/16.2 |
| 5,259,766 | 11/1993 | Sack et al. | 434/362 |
| 5,265,254 | 11/1993 | Blasciak | 395/700 |
| 5,321,828 | 6/1994 | Phillips et al. | 395/500 |
| 5,329,471 | 7/1994 | Swoboda et al. | 364/578 |
| 5,353,315 | 10/1994 | Scarola et al. | 376/259 |
| 5,355,369 | 10/1994 | Greenberger et al. | 371/223 |
| 5,371,878 | 12/1994 | Coker | 395/500 |
| 5,450,586 | 9/1995 | Kuzara | 395/700 |
| 5,539,907 | 7/1996 | Srivastava | 395/700 |

OTHER PUBLICATIONS

Y. Liao et al., "A Specificational Approach to High Level Program Monitoring and Measuring", IEEE Transactions on Software Engineering vol. 18 No. 11, Nov. 1992, pp. 969–978.

J. Yan, "Performance Tuning with AIMS–An Automated Instrumentation and Monitoring System for Multicomputers", 1994 Annual System Sciences Conference vol. II, pp. 625–633.

Primary Examiner—Robert W. Beausoliel, Jr.
Assistant Examiner—Dieu-Minh Le
Attorney, Agent, or Firm—Seed & Berry LLP

[57] ABSTRACT

A software analysis system for capturing tags generated by tag statements in instrumented source code. The software analysis system includes a probe that monitors the address and data bus of the target system. When a tag statement is executed in the target system, a tag is written to a predetermined location in the address space of the target system. The tag contains a tag value that is indicative of the location in the source code of the tag statement generating the tag. By monitoring the predetermined address, the probe is able to capture tags as they are written on the data bus of the target system. By properly instrumenting the source code, the software analysis system is able to perform a variety of analysis functions in essentially real time, including code coverage, function and task execution times, memory allocation, call pairs, and program tracing.

46 Claims, 16 Drawing Sheets

| File | Line | Type | Source | Time |
|---|---|---|---|---|
| sortdemo.c | 00095 | Entry | WinMain | 0 |
| sortdemo.c | 00130 | Entry | InitApplication | 0 |
| sortdemo.c | 00146 | Exit | InitApplication | 0 |
| sortdemo.c | 00158 | Entry | InitInstance | 0 |
| sortdemo.c | 00180 | Branch | if (!hWnd) | 60 nS |
| sortdemo.c | 00186 | Exit | InitInstance | 60 nS |
| sortdemo.c | 00112 | Branch | while (GetMessage(1.meg, NULL, NULL, NULL)) { | 3.410 uS |
| sortdemo.c | 00260 | Branch | case IDW_EXCHANGE: | 3.410 uS |
| sortdemo.c | 00529 | Entry | InitSort | 3.410 uS |
| sortdemo.c | 00531 | Branch | if (NewRandom)    // if randomize just occurred | 3.410 uS |
| sortdemo.c | 00512 | Entry | InitPrevRandom | 3.410 uS |
| sortdemo.c | 00516 | Branch | for(iRow=0; iRow<nBar; iRow++ | 3.410 uS |
| sortdemo.c | 00516 | Branch | for(iRow=0; iRow<nBar; iRow++ | 3.410 uS |
| sortdemo.c | 00516 | Branch | for(iRow=0; iRow<nBar; iRow++ | 3.410 uS |
| sortdemo.c | 00516 | Branch | for(iRow=0; iRow<nBar; iRow++ | 3.410 uS |
| sortdemo.c | 00516 | Branch | for(iRow=0; iRow<nBar; iRow++ | 3.410 uS |
| sortdemo.c | 00516 | Branch | for(iRow=0; iRow<nBar; iRow++ | 3.410 uS |
| sortdemo.c | 00516 | Branch | for(iRow=0; iRow<nBar; iRow++ | 3.410 uS |
| sortdemo.c | 00516 | Branch | for(iRow=0; iRow<nBar; iRow++ | 3.410 uS |
| sortdemo.c | 00516 | Branch | for(iRow=0; iRow<nBar; iRow++ | 3.410 uS |
| sortdemo.c | 00516 | Branch | for(iRow=0; iRow<nBar; iRow++ | 3.410 uS |

Fig. 15

| File | Line | Type | Source | Time |
|------|------|------|--------|------|
| sortdemo.c | 00186 | Exit | InitInstance | 60 nS |
| sortdemo.c | 00529 | Entry | InitSort | 3.410 uS |
| sortdemo.c | 00531 | Branch | if (NewRandom)   //if randomize just occurred | 3.410 uS |
| sortdemo.c | 00533 | Source | WT}__LINE__ 2.cock{}.XBRANCH. }; | |
| sortdemo.c | 00534 | Source | NewRandom = FALSE; | |
| sortdemo.c | 00535 | Source | // make sure rest sorts use more data | |
| sortdemo.c | 00536 | Source | slow | |
| sortdemo.c | 00537 | Entry | WTX}__Line__ 1.clock{}.XBRANCH."" };//if first sort has | 3.410 uS |
| sortdemo.c | 00512 | Source | InitPrevRandom | |
| sortdemo.c | 00514 | Source | Int iflow; | |
| sortdemo.c | 00515 | Branch §25} | WTX}__LINE__ 3.clock{}.XENTRY."InitPrevRandom{}" }; | 3.410 uS |
| sortdemo.c | 00516 | Source | for( iRow=0; iRow<iRow++ | |
| sortdemo.c | 00518 | Source | WTX}__LINE__ 2.cock{}.XBRANCH }; | |
| sortdemo.c | 00519 | Source | abarWork{}iRow} = abarPerm}iRow}; | |
| sortdemo.c | 00520 | Source | abarTemp}iRow} = abarPerm}iRow}; | |
| sortdemo.c | 00523 | Source | RandomBars(hWind); | |
| sortdemo.c | 00524 | Exit | WTX}__LINE__ +1.clock{}.XEXIT."InitPrevRandom{}" }; | 3.410 uS |
| sortdemo.c | 00552 | Exit | InitPrevRandom | 3.410 uS |
| sortdemo.c | 01033 | Entry | ExchangeSort | 3.410 uS |
| sortdemo.c | 01035 | Source | Int iRowCur, iRowMin, iRowRest; | |
| sortdemo.c | 01036 | Source | WTX}__LINE__ 3.clock{}.XENTRY."ExchangeSort{}" }; | |
| sortdemo.c | 01037 | Branch | for{iRowCur=0; iRowCur<nBar; iRowCur++ | |
| sortdemo.c | 01039 | Source | WTX}__LINE__ 2.clock{}.XBRANCH }; | 3.410 uS |

Fig. 16

METHOD AND APPARATUS FOR ANALYZING SOFTWARE EXECUTED IN EMBEDDED SYSTEMS

TECHNICAL FIELD

This invention relates to software analysis, and more particularly to a method and apparatus for analyzing a wide variety of criteria of software executed on embedded systems.

BACKGROUND OF THE INVENTION

Software is being written to control the operation of processors, including microprocessors, in a wide variety of fields. As software becomes more complex and lengthy, the probability of software errors or "bugs" increases. Furthermore, the difficulty of finding software bugs increases with this increased length and complexity of software. While bugs that prevent execution of the software will be apparent, other types of bugs merely effect the performance or efficiency of the software without preventing its execution. Software bugs that merely effect the execution of the software may easily go undetected, thus indefinitely impairing the efficiency of the software. For example, software may allocate memory resources in an inefficient manner thus preventing the software from running at optimum speed. However, since the software continues to execute, the existence of these memory allocation errors will not be apparent.

A number of techniques have been developed to analyze the performance of software in an attempt to find software bugs, including software bugs that merely effect the performance of the software execution. One traditional technique is instrumented source code in which executable tag statements are inserted into various branches and locations of source code, thereby "instrumenting" the source code. After the source code has been compiled and linked, the tag statements are executed along with the code. As each tag statement is executed, it performs an operation that can be either detected by an analysis device or recorded for later examination. For example, each tag statement may write a value to a respective address so that the identity of the address containing that value provides an indication of which tag statements were executed. As another example, each tag statement may print tag identifying data to a disk file. As still another example, an array can be reserved in memory, with each array element corresponding to a tag inserted in a respective location in the source code. As each tag is executed, it sets a corresponding bit in the array. One approach to analyzing software with instrumented code is described in U.S. Pat. No. 5,265,254 to Blasciak et al.

Using instrumented code, a wide variety of software parameters can be analyzed. Not only can instrumented source code allow one to determine which branches have been executed, but it can also determine the execution time of a branch or function by placing executable tag statements at the entry and exit points of the branch or function. When these tag statements are executed, they generate respective tags which are time stamped so that the elapsed time between executing the tag statements can be determined.

Although instrumented code is often a useful technique for analyzing the performance of software in a general purpose (i.e., "host") computer system, it is less suitable for analyzing the execution of software in an embedded system. An embedded system is a system whose primary purpose is to perform a specific function rather than to perform general computational functions. For example, a microprocessor-based microwave oven controller, a microprocessor-based automobile ignition system, and a microprocessor-based telephone switching system are all embedded systems. Embedded systems do not lend themselves to instrumented code for several reasons. First, embedded systems generally do not have mass storage devices, such as disc storage, to store the result of tag statement executions. While the result of executing a tag statement can be stored in on-board random access memory, it is often difficult to externally retrieve such information. Furthermore, storing the results of tag statement executions in system memory consumes system memory resources thus preventing the target from executing the software in a normal manner. It is generally desirable to test the performance of software in an embedded system under the same conditions that the software will normally run. Thus, an ideal software analysis technique would be "transparent" to the target system and thus have no effect on the manner in which the target system executes software. For these reasons, instrumented code is generally not suitable for analyzing software in an embedded system.

In addition to software-based software analysis techniques (e.g., instrumented code), hardware-based techniques have been developed to analyze software executing in embedded systems. For example, logic probes have been placed on the address and data bus lines of microprocessors in an attempt to observe the execution of software in embedded systems. However, it is very difficult to monitor the execution of software using logic analyzers, and the lack of any data reduction on the output of the logic analyzer makes this technique very time-consuming. Furthermore, it is not always possible to determine which instructions are being executed using the logic analyzer. For example, processors executing instructions from internal cache memory cannot be monitored using a logic probe because the execution of these instructions is not reflected on externally accessible busses.

Another hardware-based technique for analyzing the performance of software in embedded systems uses an emulator in connection with instrumented code. Basically, this technique uses an emulator to monitor the execution of tag statements thus eliminating the need to consume system memory resources and providing a means to extract tag execution data. One example of this approach is described in U.S. Pat. No. 4,914,659 to Erickson. As described in the Erickson patent, tag statements are inserted in the source code and executed in an emulator connected to the target system. Each of the tag statements writes a variable to a respective unique address. The emulator monitors the address bus of the emulated processor to detect addresses on the address bus corresponding to the respective tag statements. While the approach described in the Erickson patent does extract the tag execution data without consuming system resources, it nevertheless suffers from a number of limitations. For example, by requiring that there be a unique address reserved for each tag statement, overlay memory techniques must be employed and a substantial amount of the target system's address space is consumed.

Another hardware approach to analyzing software executing in an embedded system is described in U.S. Pat. No. 4,937,740 to Agarwal et al. The Agarwal et al. patent discloses a software analysis system in which a hardware probe monitors the address bus of the target system to capture addresses. The system disclosed in the Agarwal et al. patent includes an internal tag generator that generates tags when respective addresses (up to 256) selected by the user are captured by the probe. Since the Agarwal et al. system does not use instrumented code techniques or otherwise correlate tags generated from the captured addresses with respective software locations, the Agarwal et al. system does not provide easy to use and understand information about the execution of the software.

There is therefore a need for a method and apparatus that can analyze the execution of software in an embedded system without the requirement that the embedded system have on-board data storage and/or output port capabilities in a manner that does not consume system resources, including memory, processor time and I/O resources, of the target system.

SUMMARY OF THE INVENTION

The inventive method and apparatus analyzes embedded software being executed in a target system having a data bus and an address bus. A plurality of executable tag statements are first inserted in the source code. Each of the tag statements, when executed, causes the target system to write a tag to a predetermined location in the address space of the target system. The tags contain respective tag values so that, by the proper placement of tag statements in the source code, the tag values identify the respective locations in the source code of tag statements generating the tags. After the source code has been instrumented, it is compiled to obtain object code which then executes in the target system. During execution of the object code, the address bus of the target system is monitored to detect when the predetermined location in the address space of the target system is being addressed. The data bus of the target system is also monitored to capture a tag on the data bus when addressing of the predetermined location is detected. Based on the respective tag values of the captured tags, the inventive method and apparatus is able to determine the source code locations that are being executed.

The tags generated by respective tag statements can be of two types, i.e., control tags and data tags. Control tags include a data field having a tag value corresponding to the location in the source code of the tag statement generating the tag, as explained above. Data tags are always associated with a specific control tag, and they have a data field that provides information about an event identified by the control tag with which it is associated. Control tags may also have a tag type field that identifies the analysis function for which the tag is used.

The inventive method and apparatus is able to perform a wide variety of software analysis functions. Performance analysis can be accomplished by recording first and second times when respective first and second tags are present on the data bus. The first and second tags have respective tag values corresponding to the location in the source code of first and second tag statements generating the first and second tags. Based on the difference between the first and second times, the time required to execute the software between the first and second locations is determined.

Memory allocation analysis can be accomplished by inserting control tag statements in the source code at a locations that will cause them to be executed along with memory allocation statements. An executable data tag statement is also inserted along with each control tag to write a data tag to a second predetermined location in the address space of the target system. The data value of the data tag indicates the memory being allocated by the memory allocation statement. The inventive method and apparatus detects when the second predetermined location in the address space of the target system is being addressed to capture data tags on the data bus. The memory allocation resulting from the memory allocation statements are then determined based on the data values of the captured data tag.

Function linking can be analyzed by inserting tag statements in the source code at locations causing respective tag statements to be executed along function call statements. Based on the order in which the tags are captured when addressing of the predetermined location is detected, the inventive method and apparatus determines which functions of the source code are linked to other functions of the source code.

The inventive method and apparatus performs code coverage analysis by inserting tag respective statements in basic blocks of the source code so that the tag statements will be executed along with the basic blocks. Based on the tag values of the tags captured when addressing of the predetermined location is detected, the inventive method and apparatus determines which basic blocks of the source code have been executed.

BRIEF DESCRIPTION OF THE DRAWINGS

FIG. 15 is a screen display showing the results of a more detailed trace analysis performed by the software analysis system of FIG. 1.

FIG. 16 is a screen display showing the results of another more detailed trace analysis performed by the software analysis system of FIG. 1.

DETAILED DESCRIPTION OF THE INVENTION

Figure 1:
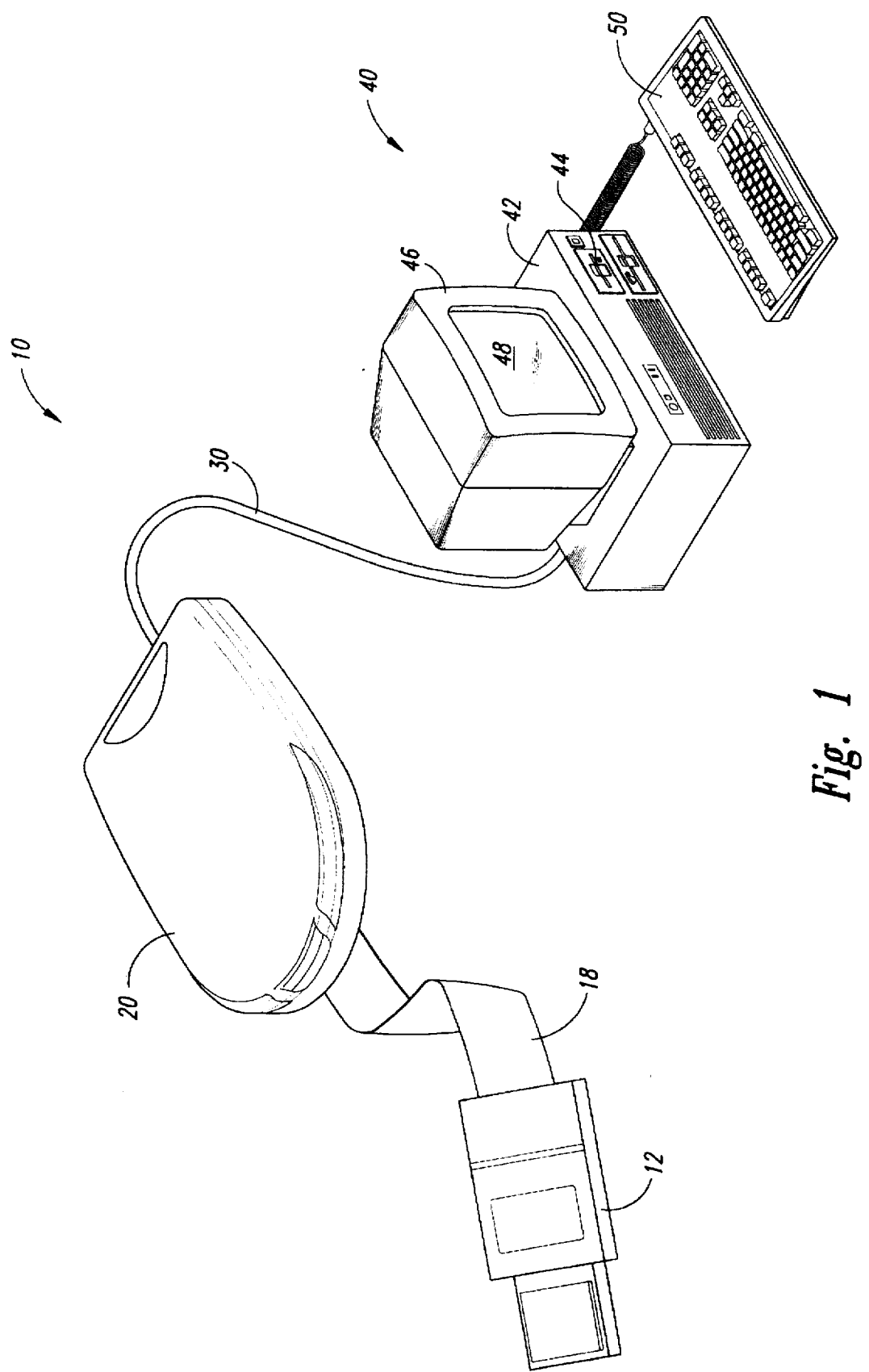
FIG. 1 is an isometric view of a preferred embodiment of the inventive software analysis system.

One embodiment of a software analysis system 10 in accordance with the present invention is illustrated in FIG.

1. The system 10 includes a probe tip 12 that clips onto the microprocessor of a target system (not shown) in a conventional manner. As a result, the external connector pins of the target system microprocessor, including its data bus and address bus, are accessible to the probe tip 12. The probe tip is connected through a conventional ribbon conductor 18 to a probe chassis 20 containing most of the electronics for the system 10. The probe chassis 20 is, in turn, connected through a suitable cable 30, such as an Ethernet cable, to a host system 40. The host system 40 is essentially a conventional computer having a processor chassis 42 with a disk drive 44, a CRT monitor 46 with a display screen 48, and a keyboard 50. The host system 40 preferably uses a Unix® or Windows® user interface and operating system. Application specific software is loaded through the disk drive 44 to cause the host system 40 to properly interface with the probe chassis 20, receive appropriate configuration and operating commands through the keyboard 50, and display analysis results on the screen 48.

Figure 2:
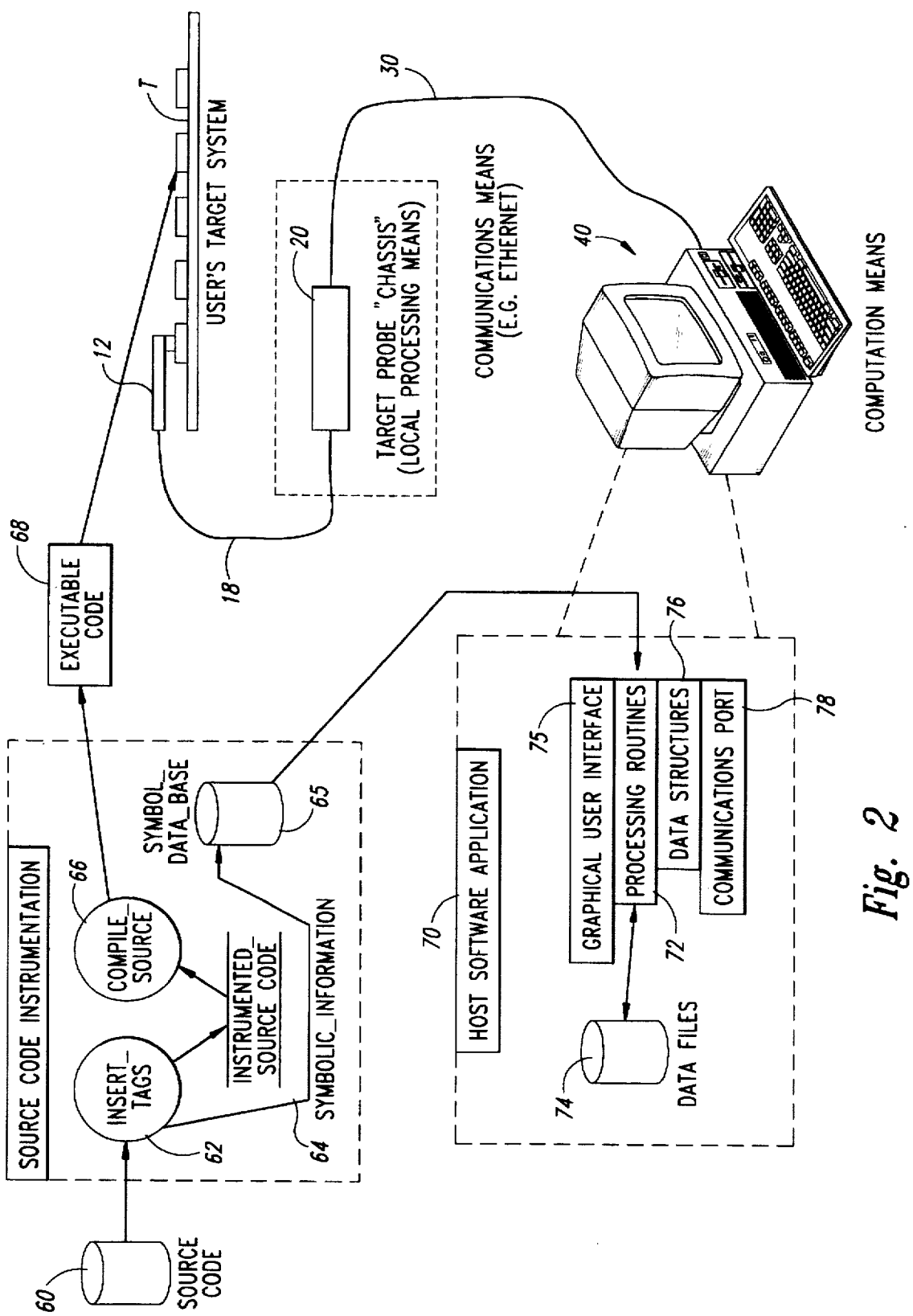
FIG. 2 is a schematic and block diagram of the software analysis system of FIG. 1 and its manner of use.

The use of the software analysis system 10 is illustrated in FIG. 2. Source code 60 written to run on a target system is first instrumented by insetting tag statements 62 in the source code 10 at various locations that the user is interested in analyzing. For example, if the user is interested in determining code coverage, the user will insert a tag statement 62 in each branch of the source code 60, and the system 10 will determine which of the branches have been executed based on whether each tag statement has been executed. Other analysis functions are described in detail below. The insertion of tag statement 62 in the source code 60 results in instrumented source code 64. When the instrumented code 64 is produced, a symbol database 65 is also created which provides a record correlating each of the tag statements to their locations in the source code 10. The instrumented source code 64 is compiled in a conventional manner at 66 thereby resulting in executable code 68. The executable code 68 is then loaded into the target system T by any suitable means. For example, the executable code may be stored in a programmable read-only memory ("PROM") that is installed in the target system T. The executable code 68 may also be executed in the target system T through a conventional emulator (not shown). Regardless of how the executable code 68 is loaded into the target T, the target T is then allowed to execute the code. The probe tip 12 clips on to the target system T in a conventional manner to make electrical contact with at least the address bus and the data bus of the target system T. Tags generated by the execution of tag statements 62 and collected by the probe tip are transferred to the probe chassis 20 through the ribbon cable 18. After the probe chassis 20 has performed various tabulation and data reduction functions on the data from the probe tip 12, it outputs appropriate data to the host system 40 through the local area network cable 30. Host application software 70 includes processing routines 72 that store data in and retrieve data from data files 74, and the host application software 70 also includes a graphical user interface 75, such as the X-11 or Microsoft Windows® interface, that works with the processing routines 72 to operate on the data files 74 and provide various displays of analysis data. The processing routines 72 also receive the symbol database 65 so that the tag execution data in the data files 74 can be correlated with the location of the tag statements in the source code 65 in order to provide reports and displays that specify performance in terms of source code locations and branches. The symbol database 65 is preferably loaded into the host through the disk drive 44 (FIG. 1). The host application software 70 also includes data structure 76 for storing and handling the analysis data, and communications software 78 for providing communication with the target access probe 20.

In operation, each of the tag statements 62 generate a respective tag containing a data field having a "tag value" that is generally unique to the location of the tag statement in the source code 60. Thus, for example, a first branch may contain a tag statement having a tag value of 1. A second branch may contain a tag statement having a tag value of 2, and so forth. When the tag statement 62 is executed by the target T, a processor in the target T writes a tag containing the tag value to a predetermined location in the address space of the target system T. As explained in greater detail below, the tag 62 may also contain at least one other field providing information about its function or location of its associated tag statement 62 in the source code 60. More specifically, the tag statement 62 preferably writes a tag consisting of 32 bits which includes not only a data field word having a tag value, but also a number of bits which define the type or category of tag. For example, different tag types may identify function entry and exit points, branch points, and memory allocation statements. Tags having a tag type field to identify the tag type are known as "control tags." In the preferred embodiment of the system 10, all control tags are written to the same location in the address space of the target. In addition to control tags, the system 10 also utilizes data tags. Data tags accompany control tags and are written to a second location in the address space of the target to provide additional information relevant to a particular control tag. For example, a control tag may indicate that a memory allocation is taking place, and two data tags accompanying the control tag may indicate the size of the memory allocation and the memory pointer associated with that allocation, respectively. Since only a single location in the address space of the target system preferably is used for control tags and a relatively few locations used for data tags, the inventive system 10 does not significantly use the memory resources of the target system, thus making the analysis system substantially transparent to the target system.

The probe tip 12 monitors the address bus and the data bus of the target T and determines when the processor addresses the predetermined location(s) in the address space of the target system T. The probe tip 12 then captures the tag value currently on the data bus. As a result, the currently captured tag value indicates the location in source code 60 currently being executed. Moreover, the system 10 monitors the execution of the software in the target T in essentially real time since the probe 20 receives each of the tag values as it is captured and performs various functions using the tag value. For example, for some software analysis functions, the probe 20 associates an execution time with the tag value so that the execution time between a pair of tag statements can be determined. The probe chassis 20 may also perform various data reduction operations on the tag value, such as, for example, call pair analysis (i.e., generating statistics on functions that are called by other functions) allocation. Basically, the system 10 is capable of determining function and task execution times, coverage analysis, i.e., identifying portions of the source code executed or not executed, memory allocation analysis (i.e., identifying how much memory each allocation statement in the source code allocates and identifying specific allocation errors), and program tracing (i.e., creating a sequential history of the execution of the source code). Once again, the probe chassis 20 performs these functions in essentially real time. Finally, the probe chassis 20 communicates with the host 40 to upload the data and allow it to be displayed by the host.

Figure 3:
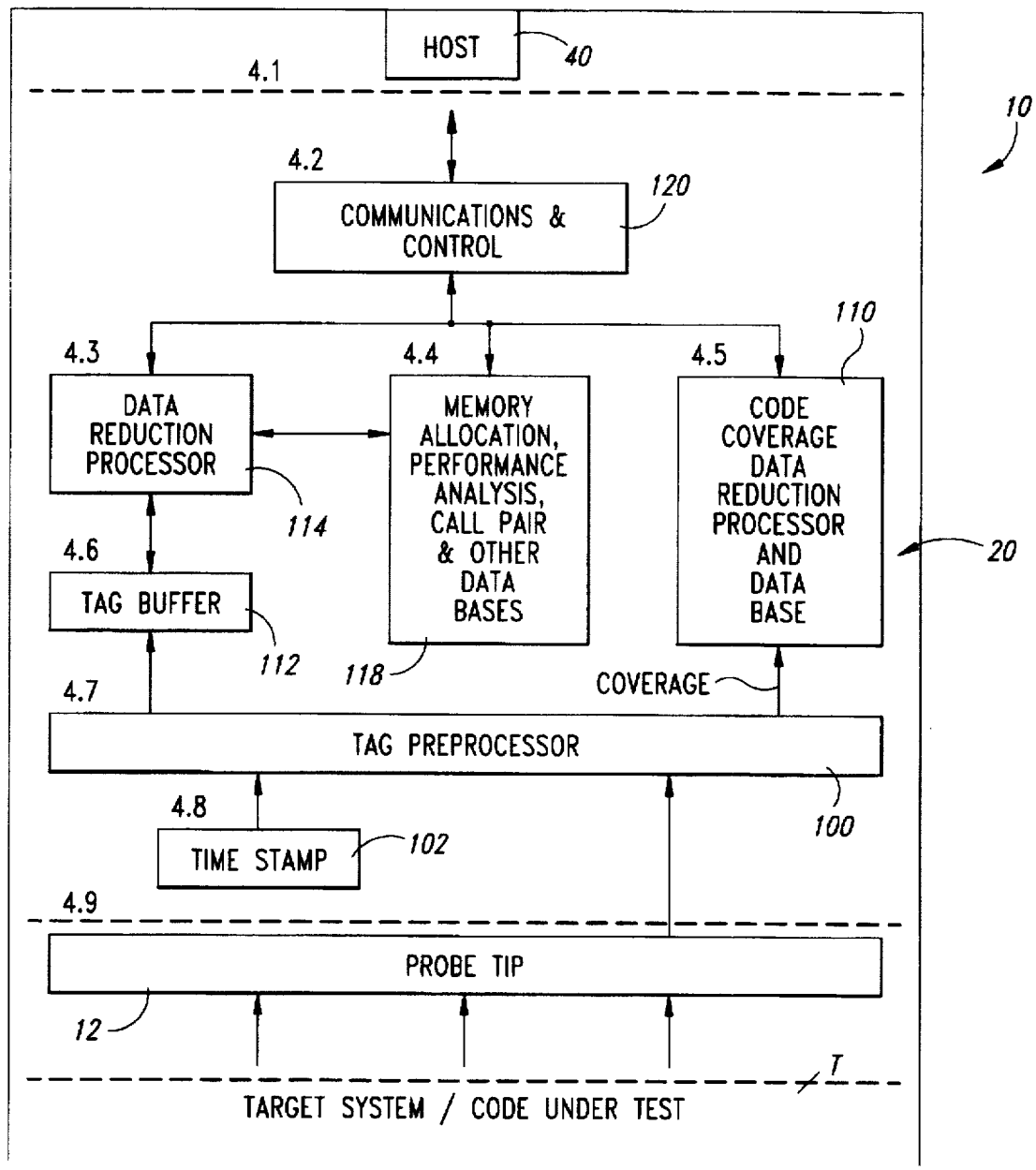
FIG. 3 is a more detailed block of the software analysis system of FIG. 1.

The software analysis system 10 of FIGS. 1 and 2 is shown in greater detail in the block diagram of FIG. 3. With reference to FIG. 3, the probe tip 12 includes a conventional LCA commercially available from Xilinx that is programmed by information downloaded from the host 40 through the probe chassis 20 to monitor one or more predetermined addresses on the address bus. When the probe tip 12 detects that one of the predetermined addresses is active, it clocks the tag on the data bus into the probe tip 12. As the probe tip 12 must interface with a specific microprocessor used by the target system T, the probe tip is usually specific to the particular microprocessor used by the target T. However, the probe tip 12 is the only target processor specific portion of the system 10. The probe tip 12 preferably also monitors the status bus of the probe tip 12 so that it can detect a write function to one of the predetermined addresses.

When the probe tip 12 captures each tag, it passes the tag to a tag preprocessor 100 which also receives a time stamp from a time stamp generator 102. The tag preprocessor 100 pairs the current time stamp value from the time stamp generator 102 with the tag values received from the probe tip 12. It also determines where the time stamped tag values are to be routed based on the tag type. As explained above, the tag type is defined by the value in the tag type field in the tag received from the probe tip 12. More specifically, if the tag is a coverage analysis tag generated by a tag statement placed in a branch of the source code to determine if the branch is executed, the tag is passed directly to a code coverage data reduction processor and database 110. All tag types other than coverage analysis tags are passed to a tag buffer 112. It is desirable to process the code coverage tags separately from the other tags because coverage tags are generally far more frequent than other types of tags. The tag preprocessor 100 also preferably performs some qualification on the tags before passing them to the tag buffer 112 or code coverage data reduction processor and database 110. More specifically, the tag preprocessor 100 preferably passes only the tags for the measurement being performed to minimize the number of tags that must be processed and thereby maximize the speed of downstream circuitry. The tag preprocessor 100 is preferably implemented using a conventional LCA commercially available from Xilinx that is programmed by information downloaded from the host 40 through the probe chassis 20 to perform the functions described above.

The code coverage data reduction processor and database 110 is preferably a hard-wired logic circuit, but it may also be implemented using a microprocessor and associated circuitry. The code coverage data reduction processor and database 110 converts captured code coverage tags to indices in a code coverage data base array. Each bit in the array represents a single tag value corresponding to the location in source code 60 in which the corresponding tag statements were inserted at 62 (FIG. 2). Thus, the contents of the array, which may be downloaded to the host 40, provides an indication of all instrumented branches of the source code that have been executed.

The tag buffer 112 is a high speed buffer that temporarily stores the tags received from the tag preprocessor 100. The tags are then passed on to a data reduction processor 114. The tag buffer 112 is used to accommodate tags received in bursts at a much faster rate than can be handled by the data reduction processor 114. The tag buffer 112 can accommodate high speed bursts of tags from the tag preprocessor 100 as long as the average rate of tags passed by the tag preprocessor 100 does not exceed the processing rate of the data reduction processor 114.

Figure 4:
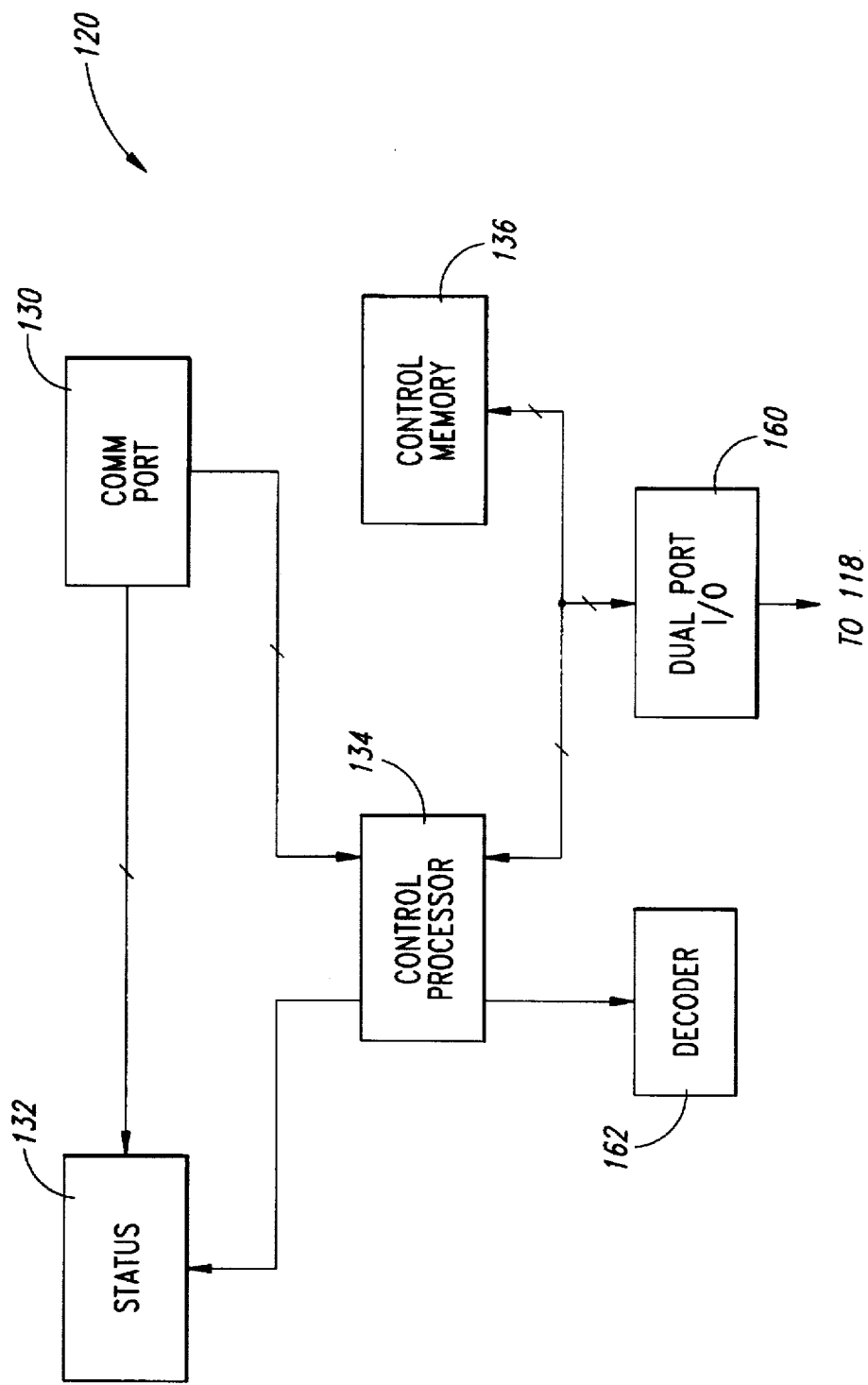
FIG. 4 is a block diagram of the communications and control circuit shown in the block diagram of FIG. 3.

The communications and control circuit 120 is illustrated in greater detail in FIG. 4. The interface between the probe chassis 20 and the host 40 consists of a standard Ethernet communication channel. The Ethernet transmission status signals are routed through a communications port 130 to a status port 132. The communications port 130 is preferably implemented with a Motorola MC68340 control processor.

As explained in greater detail below, a control processor 134 handles commands from the host software and initialization of the probe chassis 20. The control processor 134 also has direct access to the communications port 130 and a control memory 136. The control processor 130 is preferably an MC68340 microprocessor. The control memory 136 stores the instructions for the control processor 134 software as well as data storage for the control processor 134. The control memory 136 is preferably non-volatile memory, such as flash memory for code storage and DRAM for data storage. As explained in greater detail below, the control processor 134 has dual port access to the database memory 118 and database 110 to transfer data to the control memory 136.

Figure 5:
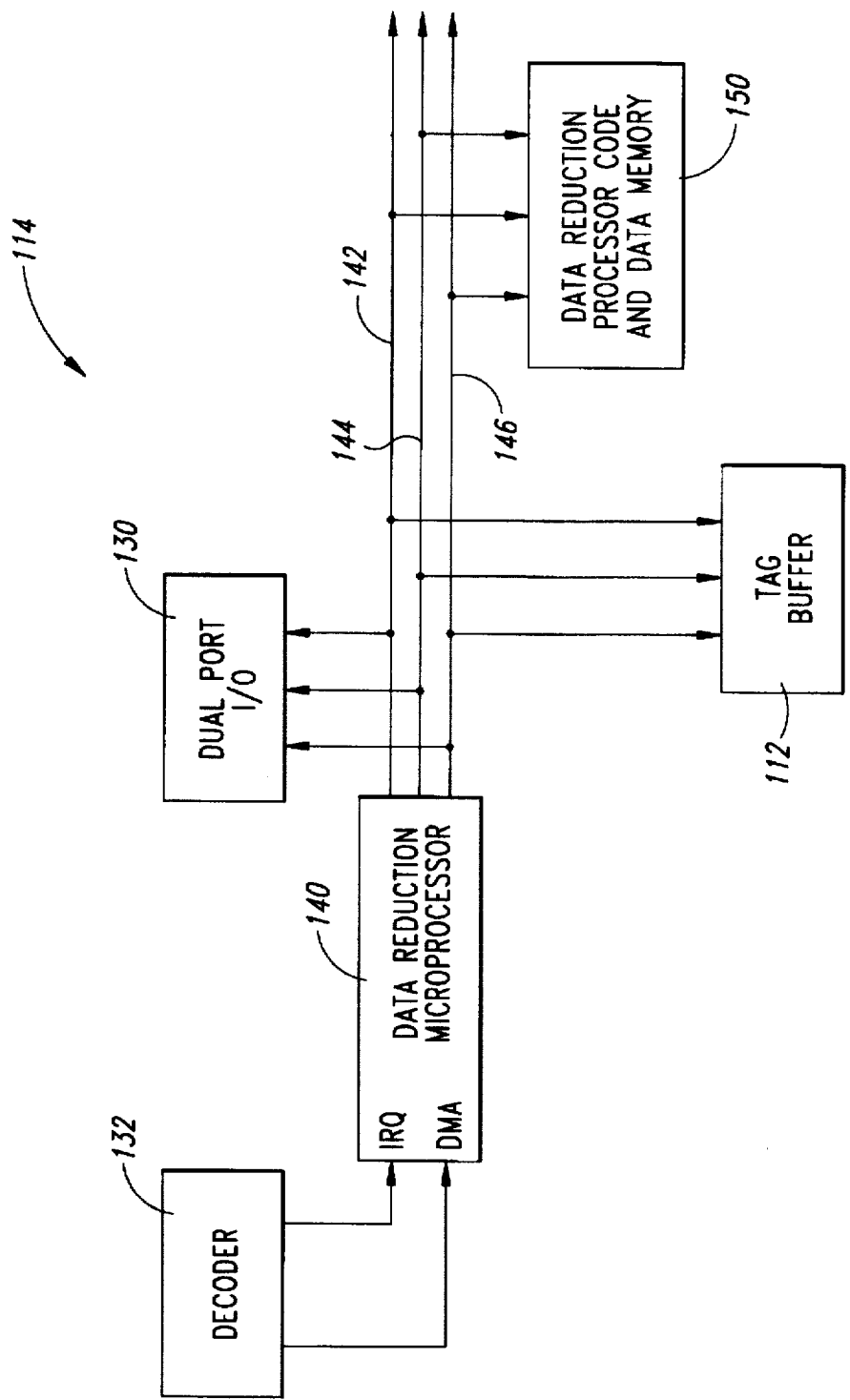
FIG. 5 is a block diagram of a data reduction processor shown in the block diagram of FIG. 3.

The data reduction processor 114 is illustrated in greater detail in FIG. 5. The data reduction processor 114 includes a data reduction microprocessor 140 having a data bus 142, an address bus 144 and a control and status bus 146 connected to the data base memory 118 (FIG. 3). The data reduction microprocessor 140 is also connected to data and code storage memory 150, the tag buffer 112 and an I/O port 160 through these busses 142, 144, and 146. The data reduction microprocessor 140 processes tags from the tag buffer 112 (FIG. 3), as explained above, under control of instructions from the code storage memory 150. The data reduction microprocessor 140 also communicates with the control processor 134 (FIG. 4) using the I/O port 160, and a decoder 132. The control processor accesses data in the data base memory 118 through the I/O port 160 under the control of the DMA and interrupt channels of the data reduction microprocessor 140. The DMA channel of the data reduction microprocessor 140 transfers data to or from the data base memory 118 and to or from the I/O port 160 each time the control processor 134 reads from or writes to the I/O port 160. This provides the control processor 134 dual port access to the data base memory 118. As a result, relatively inexpensive DRAM may be used in the data base memory 118 as dual ported memory between the data reduction microprocessor 140 and the control processor 134. Furthermore, the control processor 134, which is relatively slow, is able to effectively access the data base memory 118 using only a single bus cycle of the data reduction microprocessor 140 and minimizing the delay to the data reduction calculations.

The data reduction processor 114 performs most of the functions in the probe chassis 20. The data reduction processor 114 processes tags from the tag buffer 112 and stores resulting data in structured form in a database memory 118 for various types of performance analysis such as memory allocation, execution time, real time trace, etc. Thus, the database memory 118 stores data resulting from the capture of all of the tags other than code coverage tags. By extracting and saving pertinent data from the tags and then discarding the tags, the required capacity of the database memory 118 can be relatively small. Also, the required memory capacity is dependent only on the number of functions or task instances being monitored and not the number of tags received from the tag buffer 112. As a result of the database structure (i.e., the size of the database is proportional to the number of events monitored rather than the number of occurrences of such events), analysis of a software program can run for an indefinite period of time to be sure that the software is adequately tested and yet no data is missed, i.e., the measurement is non-sampled.

In order for the data reduction processor 114 to make meaningful measurements of an embedded software program, it must track the software execution context. Since most modern embedded programs use some kind of real-time operating system ("RTOS"), this means that the data reduction processor 114 must be aware of the RTOS execution context.

Three events which are controlled by the RTOS must be tracked: when a task is created, when a task is deleted, and when a task switch (swap) occurs. In order to accomplish this, a second instrumentation step (beyond application program source instrumentation) is required. Most modern commercial RTOS provide call outs which conveniently allow a user supplied software function to execute when a specific RTOS event occurs. A simple function linked into the appropriate call outs for the above three RTOS events outputs the appropriate control tag to indicate the kind of RTOS event, and one or more data tags to uniquely identify the RTOS task(s) affected. In a similar fashion, custom-built RTOS may be easily modified to emit the appropriate tag as well.

The data reduction processor 114 takes a different action depending upon which RTOS tags are received. When a "task create" tag is received, the data reduction processor 114 establishes in memory a stack area for the task. When a "task delete" tag is received, the data reduction processor 114 deletes the stack after tabulating any remaining measurement results into the appropriate data base. When a "task switch" tag is received, the data reduction processor 114 suspends any measurement activity for the current task stack, and switches to another stack which corresponds to the task ID received (as a data tag).

The data reduction processor 114 also tracks context at the function level within each task using tags emitted at each function entry and exit point. When a switch to a task occurs, the data reduction processor 114 will receive a function entry tag from the first function in the task, and will record the entry on the stack (e.g. function "A"). If a second function ("8") entry tag is received prior to the exit tag for function A, function B's entry tag is recorded on the stack, and the data reduction processor 114 "knows" that a function nesting has occurred, i.e. A has called B. For performance measurement purposes, the time stamp corresponding to each tag is recorded on the stack as well.

When a context change occurs such as a task swap (e.g., from task "Y" to task "Z"), the current time is recorded on Y's stack such that no further execution time will be attributed to it while the program executes other tasks. The data reduction processor 114 then switches to the stack corresponding to task Z and begins tracking time for each tag emitted while executing task Z. Should the RTOS swap back to task Y, the times and function nesting of task Z are "frozen", as described for task Y above. The data reduction processor 114 then points back to Y's stack, and the appropriate timers resume counting time where they left off. Since the function hierarchy context of task Y has been preserved on Y's stack, the system is able to accurately track the continuation of task Y's activity. When a "delete task" tag is received, any execution information preserved on the task's stack is tabulated a final time in the appropriate data base.

This context tracking method enables many sophisticated qualifications of program measurements based upon software execution context. Performance measurements may be qualified such that function execution time is tracked only when the program is executing a particular task, thereby eliminating executions from a different context of functions shared between two or more tasks. While performance measurements have been described as a typical example, other measurement qualifications are equally possible and desirable. For example, a trace history measurement can also be qualified by the software context such that tags will only be stored in the trace buffer when executing in a particular task, or a particular function nesting hierarchy. Memory allocation could be tracked only when the program is executing in a particular task context, etc.

The data reduction processor 114 performs call pair measurements by tracking which functions called other functions by identifying consecutive function entry tags generated by respective tag statements in the source code for the calling and called functions. The data reduction processor 114 updates this information each time a new function entry tag is received. The resulting data can be stored as either a count of executions of each call pair or a flag indicating at least one execution of each call pair.

Finally, the data reduction processor 114 performs memory allocation measurements based on receiving from the tag buffer 112 memory allocation tags generated by tag statements inserted into allocation statements in the source code. These memory allocation tags (including control tags and data tags) indicate how much memory was allocated or freed by each call to a memory allocation function.

The design goal for memory allocation tagging is to record successful allocations and deallocations, including the original allocation size and site (caller identifier), and allocation errors, including block overwrites, block underwrites and heap corruption (i.e. writes out of bounds references), writes to deallocated blocks, and erroneous arguments to interface routines (e.g. wild pointers).

Implementing memory allocation tagging includes an error-checking memory allocator and an instrumented interface to it, a set of instrumentation rules for modifying user code, and a set of replacements for the standard memory allocation routines. The error-checking memory allocator is based on a straight forward heap-based memory allocator. The interface to the allocator is based on the standard memory allocation routines, augmented with the addition of a memory management tag (e.g. augmented-malloc). The tag encodes the kind of the memory [de]allocation call (e.g. malloc, realloc, free, etc.), and the caller identifier. Information about each allocation is kept, including the requested size and the caller identifier of allocation site; for later reference when the block is deallocated, or an error is discovered in the block.

When a block is successfully allocated, a data and control tag are written to announce the allocation, including the size for the allocated block (a data tag), and the kind and caller identifier of the allocation (a control tag). When a block is successfully deallocated, a data and control tag are written similar to that for a successful allocation, including the size for the allocated block, the kind of the deallocation, and the caller identifier of the allocation.

The base allocator is augmented with error checking, including verification of the arguments to the allocation and deallocation routines, the integrity of each block present in the heap, whether currently allocated or freed, and the integrity of the heap as a whole. When an error is identified, a set of data and a control tag are written to indicate the error. The information present in the tags include an error identifier, the address of the block in error and its size (if any), the caller identifier(s) of the block's allocator and deallocator (if any), and the kind of allocator call begin attempted when the error was discovered.

Instrumented C code, which calls the standard memory allocation routines, is changed to replace the original calls with calls to the corresponding instrumented interface, which allows for the addition of a memory management tag, as described above. Uninstrumented C code, which calls the standard memory allocation routines (e.g. precompiled libraries), is provided for by a set of routines with the same signature as the standard routines, but which call the corresponding instrumented interface, and pass an "unknown" caller identifier.

In addition to the provisions made for C code as described above, instrumented C++ code must also handle the use of the global versions of operators new and delete.

For instrumented C++ code which calls the default operator new, a file local definition is supplied, using placement syntax, which augments the standard operator new signature with a memory management tag argument. Uses of the default operator new are replaced with calls to the augmented version, whose definition simply calls the instrumented interface to the allocator (i.e. augmented-malloc). For uninstrumented C++ code, a default version of global operator new is provided which calls augmented-malloc with an "unknown" caller id.

For instrumented C++ code which calls the default operator delete, a file local definition of the default delete operator is provided which does nothing. Calls the (now, do nothing) operator delete are followed by a call to the instrumented interface (i.e. augmented-free), along with an appropriate memory management tag. For uninstrumented C++ code, a default version of global operator new is provided which calls augmented-free with an "unknown" caller id.

Returning to FIG. 3, the probe chassis 20 communicates with the host 40 through a communications and control circuit 120. Under command of the host processor 40, the communications and control circuit 120 can directly access data stored in the database memory 118 or the code coverage data reduction processor and database 110 so that such data can be transferred to the host 40 for further processing and display. The communications and control circuit 120 also routes commands from the host 40 to the probe chassis 20 to select the mode of probe operation, including specifying the function to be performed and the tag types to be collected.

Figure 6:
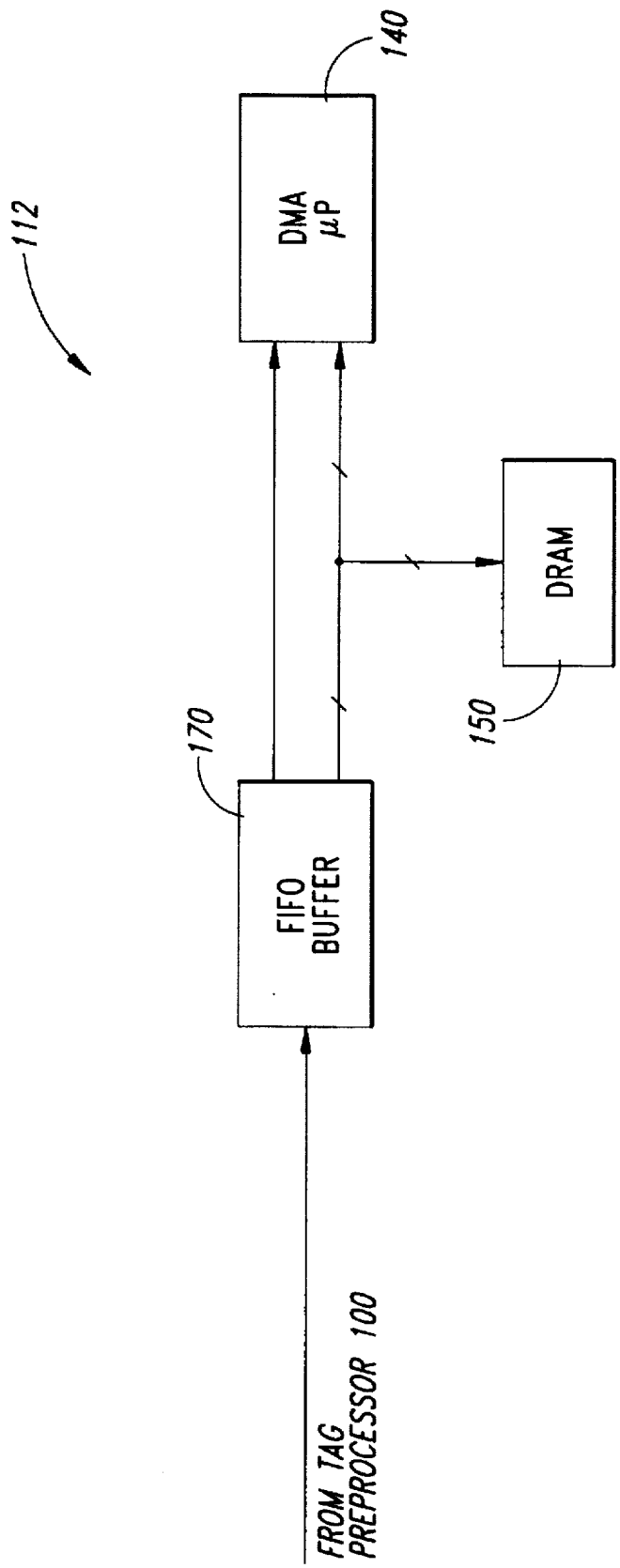
FIG. 6 is a block diagram of a tag buffer shown in the block diagram of FIG. 3.

The tag buffer 112 (FIG. 3) is shown in FIG. 6 along with its interface to the data reduction processor 114. As explained above, tags are often captured by the probe tip 12 in bursts at rates that exceed the maximum processing rate of the microprocessor 140. One apparent solution to averaging the tag capture rate is to use a first-in first-out ("FIFO") buffer. However, FIFO buffers capable of operating at high rates of speed having sufficient capacity to store large numbers of tags are relatively expensive. The tag buffer 112 illustrated in FIG. 6 is able to effectively implement a large capacity, high speed FIFO buffer using a high speed, low capacity FIFO buffer 170 of conventional design. The FIFO buffer 170 normally receives tags from the tag preprocessor 100 (FIG. 3) and sequentially outputs those tags to the microprocessor 140. The microprocessor 140 then stores the tags in the DRAM 150 while awaiting data reduction and processing. However, in the event that the relatively low capacity FIFO buffer 170 becomes filled, it outputs a bit to the direct memory access ("DMA") input of the microprocessor 140. The microprocessor 140 then allows the FIFO buffer 170 to write data directly to the DRAM 150, thereby speeding up the writing of data in the DRAM 150.

Figure 7:
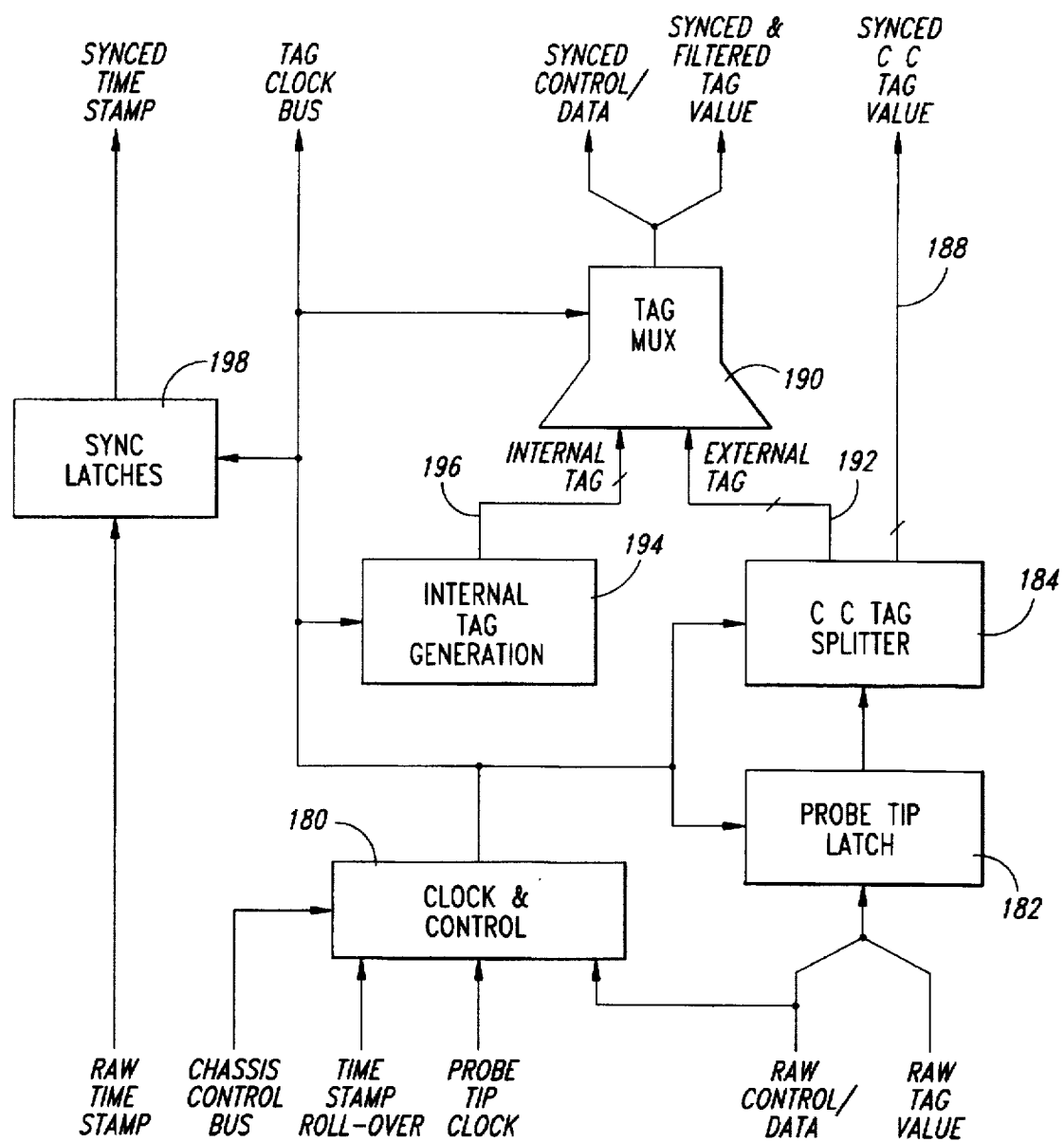
FIG. 7 is a block diagram of a tag preprocessor shown in the block diagram of FIG. 3.

As mentioned above, the tag preprocessor 100 combines the tags received from the probe tip 12 with a time stamp received from the time stamp generator 102 and routes them to either the data reduction processor 114 or the code coverage data reduction processor and database 110. The tag preprocessor 100 is shown in greater detail in FIG. 7. A clock and control circuit 180 interfaces with the time stamp generator 102 (FIG. 3), a clock signal received from the probe tip 12 and control bits from the data reduction processor 114. The clock and control circuit 180 then controls the operation of other components in the tag preprocessor 100. The tag preprocessor 100 includes a probe tip latch 182 that, when triggered by the clock and control circuit 180, latches into the tag preprocessor 100 the tag type field and the tag value. Based on the tag type, a code coverage tag splitter 184 routes the tag to either the code coverage data reduction processor and database 110 (FIG. 3) via bus 188 or to a tag multiplexer 190 via bus 192. The tag preprocessor 100 also includes an internal tag generator 194 that can apply an internal tag to the tag multiplexer 190. The data reduction processor 114 controls the tag multiplexer 190 to apply either the internal tag on bus 196 or the tag from the probe tip 12 on bus 192 to the tag buffer 112. Finally, a synch latch 198 latches in the time stamp at the appropriate time under control of the clock and control circuit 180 so that the time stamp is synchronized to the currently captured tag.

Figure 8:
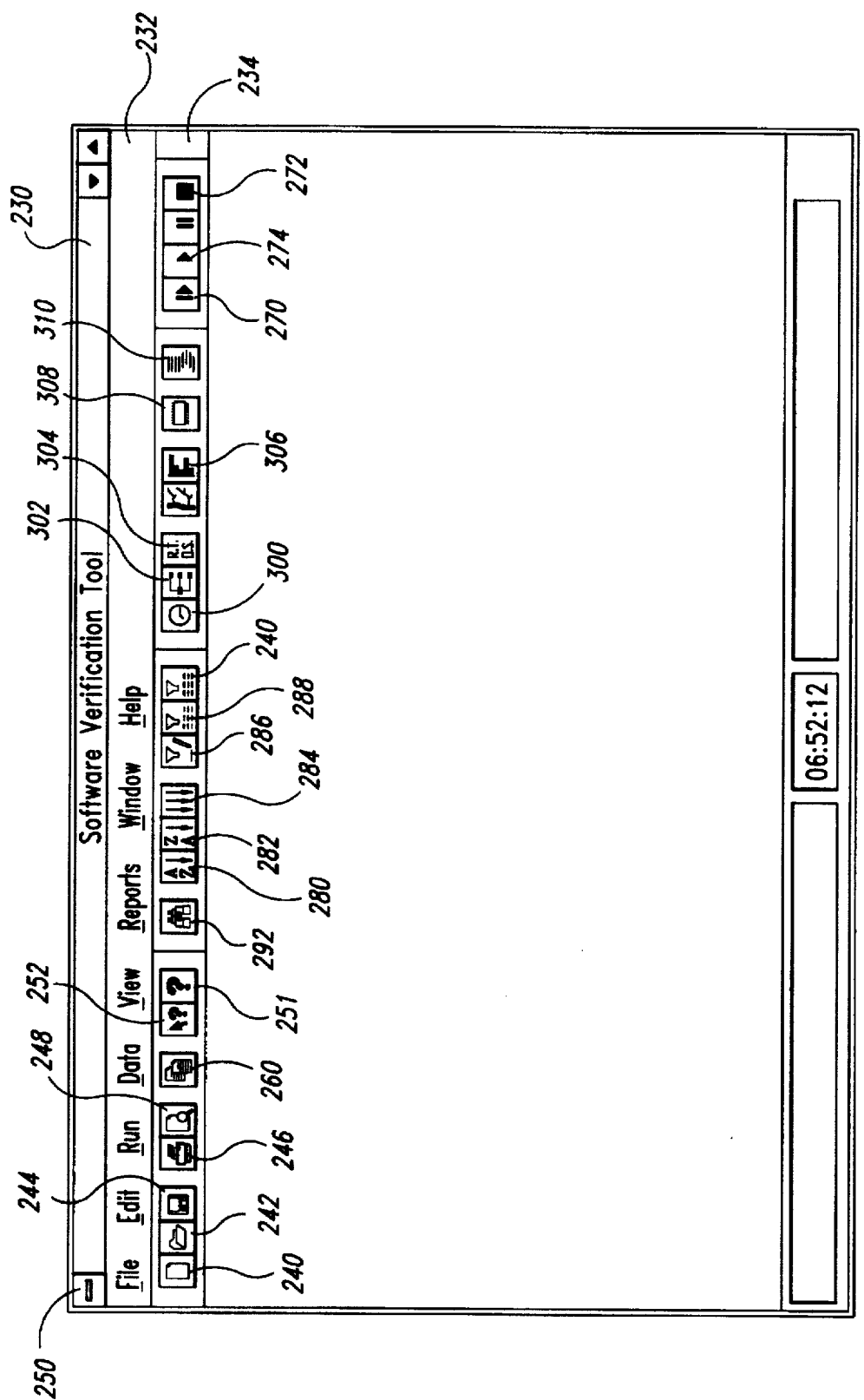
FIG. 8 is a screen display of the command window for the software analysis system of FIG. 1.

The user interface for the host system 40 is best illustrated with reference to the user interface command bar shown in FIG. 8. During the operation of the software analysis system 10, the display screen 48 of the monitor 46 (FIG. 1) displays a title bar 230 at the upper portion of the screen. A command bar 232 for entering commands into the system 10 is positioned below the title bar 230. Finally, a tool bar 234 adapted to allow direct entry of commands available in the command bar 232 is positioned beneath the command bar 232. Most of the file commands available in the command bar 232 may be directly selected by clicking on appropriate icons of the tool bar 234 using a pointing device, such as a mouse. A new file icon 240 causes the system to save unsaved data, closes any open views on the screen and invokes a configuration dialog to allow configuring for a new task. An 'open" icon 242 invokes a dialog for loading and displaying analysis results saved from a prior test A "save icon 244 invokes a file save dialog to save analysis data resulting from a test. The save command presumes that the data has already been given a file name. If not, the file save dialog requests the user to enter a file name under which file data is saved. A "print" icon 246 invokes a print dialog which allows the software analysis system to print reports showing analysis data or subsets of data. A print preview icon 248 allows the viewer to view on the screen how the printed document will appear. The user can exit the Windows software by either double-clicking on an exit bar 250 or selecting "exit" as a file command in the command bar 232.

The edit command in the command bar 232 consists of a single command, namely, a "copy" command. This command, which can be entered by selecting a "copy" icon 260 in the tool bar 234 copies selected data into a clipboard (i.e., temporary storage) so it can be pasted into another application such as a spreadsheet program.

Several run commands available from the command bar 232 may also be entered through the tool bar 234. A "run"

icon 270 erases any previously acquired data and begins the acquisition of data from the probe 12 while performing an analysis function. A "halt" icon 272 halts data acquisition from the probe until a resume icon 274 is selected. There are a large number of data commands that can be selected from the command bar 232 or from the tool bar 234. A "sort ascending" icon 280 sorts in an ascending order active data acquired from an analysis by values in the selected column. Similarly, selecting a "sort descending" icon 282 causes the acquired data to be sorted in a descending order. Selecting a "sort multiple" icon 284 invokes a sort dialog for setting up a multi-level sort.

An "edit filter" icon 286 invokes a filter dialog for setting up a data filter for an active view. Filtering a display causes only selected measurement results to be displayed, i.e., only the functions of interest. An "apply current filter" icon 288 causes the system to apply a previously specified filter to the active data view. A "show all" icon 290 removes the data filter so that all of the acquired data is displayed in the active view. A "find" icon 292 invokes a find dialog for setting up a search within an active view.

A variety of data commands can also be entered through the command bar 232 or directly through the tool bar 234. A "function performance" icon 300 is selected to invoke a function performance table to display function performance data that has been acquired from the probe or loaded from a file stored form a previous analysis. A "task performance" command can be selected from the view menu in the command bar 232, but there is no corresponding icon in the toolbar. A "task performance" command displays previously acquired task performance data from either the probe or a file. A "call linkage" performance icon 302 invokes a call linkage table to display call pair data from the probe or from a file of call pair data acquired in a previous test. A "branch coverage" icon 304 is selected to invoke a branch coverage table to display coverage data from the probe or from a file saved from a previous test. A coverage summary graph icon 306 invokes a coverage summary graph to display a statistical record of coverage data from the probe or from a file stored from a previous analysis. A "memory allocation" icon 308 is selected to invoke a memory allocation table to display memory allocation data acquired from the probe or from a file saved from a previous test. Finally, a "trace analysis" icon 310 invokes a trace view in the display window to display trace data acquired from the probe or from a file saved from a previous test.

The command bar 232 also allows standard Windows® commands, such as hiding or showing the tool bar 234, cascading or tiling open view windows, arranging icons, etc. The tool bar 234 also includes an index icon 250 to invoke a top level contents page for on-line help in operating the system 10 and a second "help" icon 232 which may be "dragged" and "dropped" to any item on the display to obtain help about that item. Thus, the Windows® user interface allows the software analysis system to be easily and quickly operated by relatively inexperienced personnel. A similar user interface running on UNIX® workstations utilizing a X-11 windowing system provides similar ease and speed of use.

Figure 9:
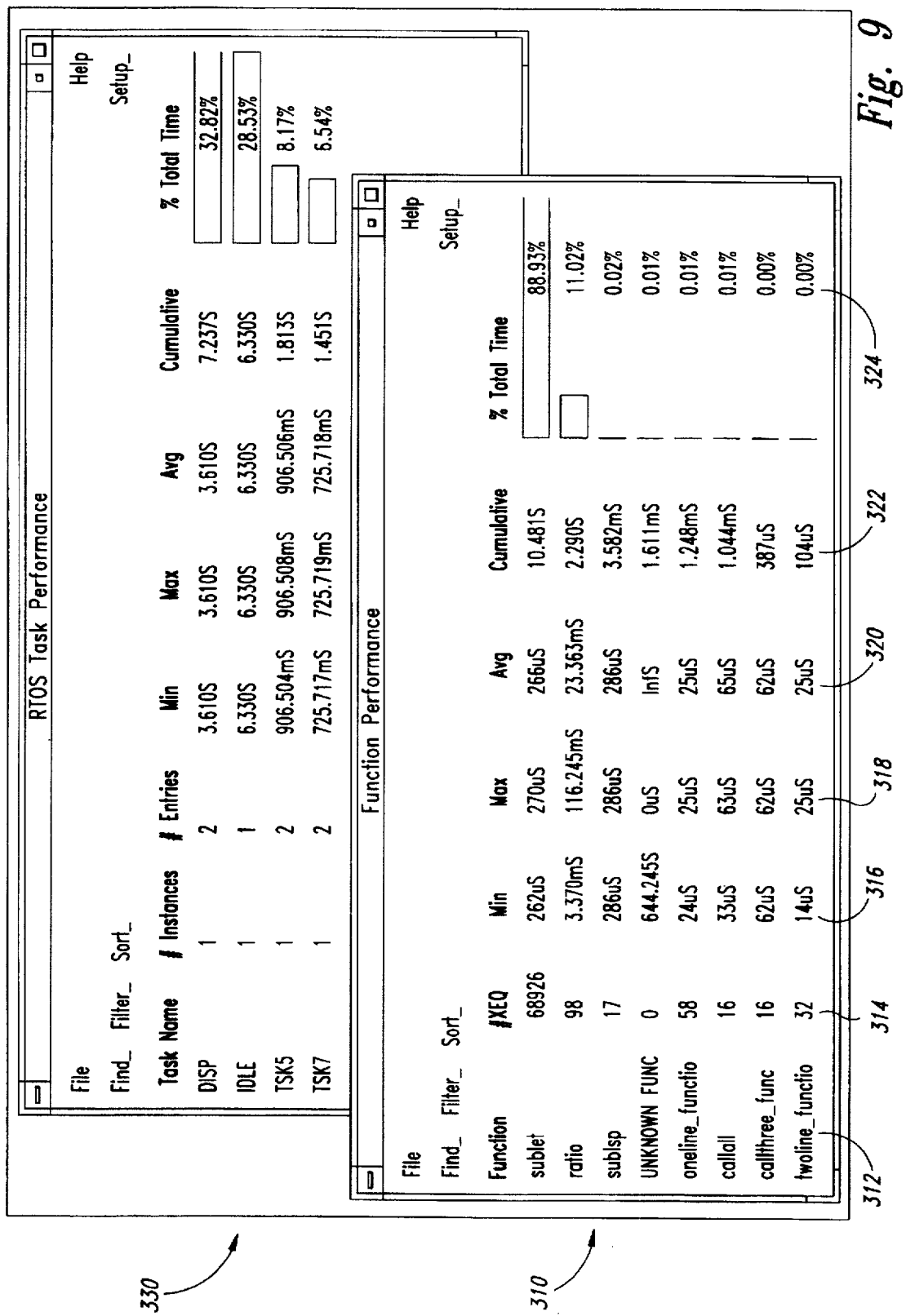
FIG. 9 is a screen display showing the results of two different types of software performance analysis performed by the software analysis system of FIG. 1.

Examples of performance analysis displays are illustrated in FIG. 9 for both task performance and function performance. The function performance display 310 includes a first column 312 listing various functions performed by the source code followed by a column 314 showing the number of times each of those functions was executed. Time columns 316, 318, 320 then show the minimum, maximum, and average time, respectively, required to execute each of the functions listed in the column 312. The cumulative time spent executing each of the functions (i.e., the product of the number of executions and the average) is then displayed in column 322. Finally, column 324 displays the percentage of time that each of the functions listed in the first column 312 were being executed. The data in column 324 can be calculated as the ratio of each entry in column 322 to the sum of the entries in column 322.

A task performance analysis display screen 330 is similar to the function performance analysis display screen 310 and, in the interest of brevity, its explanation will not be repeated. The performance analysis ratios shown in column 324 can also be displayed as a bar graph histogram.

Figure 10:
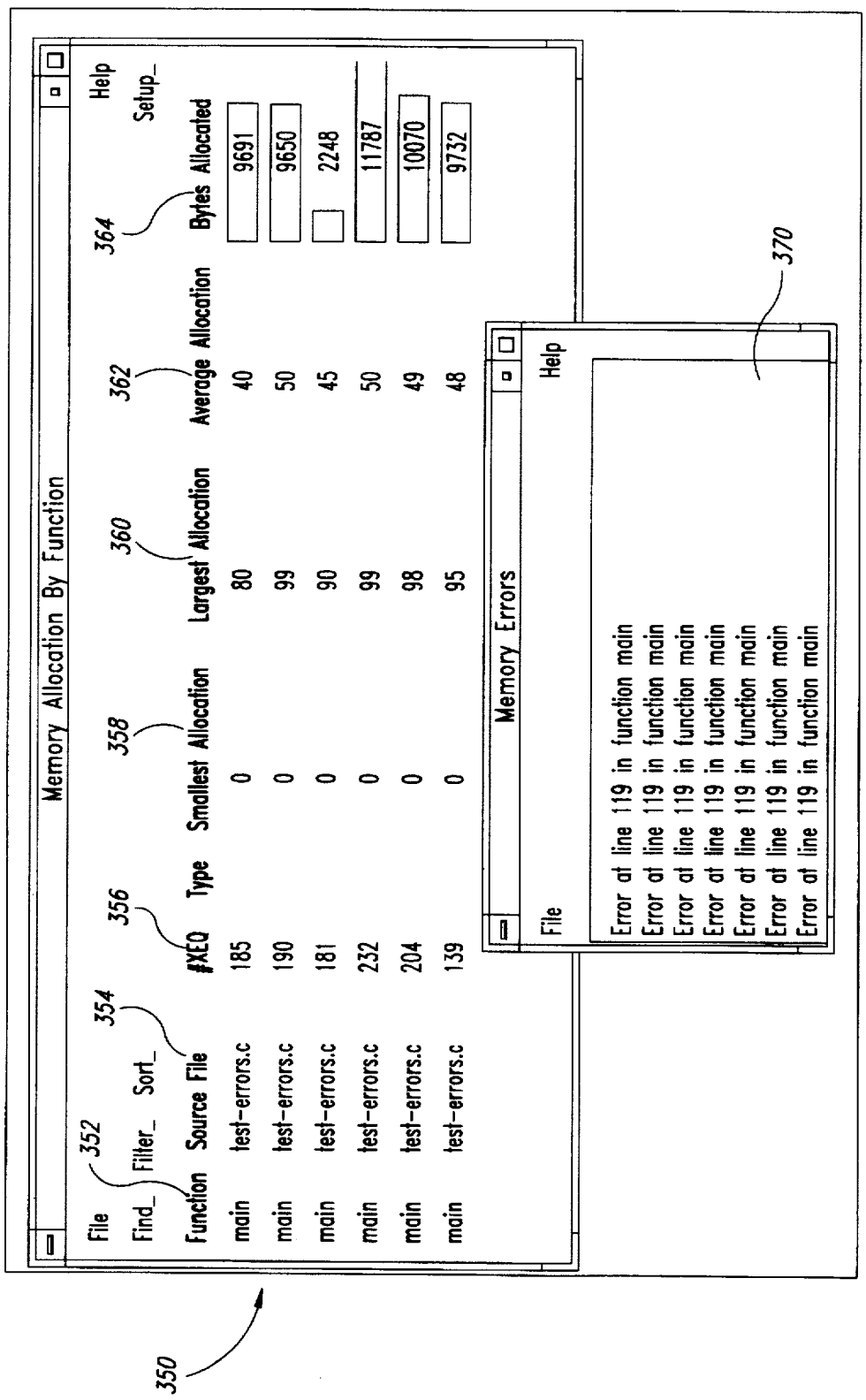
FIG. 10 is a screen display showing the results of a memory allocation analysis performed by the software analysis system of FIG. 1.

As explained above, the software analysis system 10 can also perform a dynamic analysis of memory allocation, and an example of the display of data from such analysis is shown in FIG. 10. A memory allocation screen 350 includes a first column 352 listing each of the functions containing a memory allocation statement. A second column 354 lists the source file for each of those functions. The next column 356 lists the number of times each of those functions were executed and the next three columns 358, 360, 362 lists the smallest memory allocation, the largest memory allocation and the average memory allocation, respectively. The final column 364 contains a bar graph and a digital display of the memory bytes currently allocated. By viewing the bar graph in column 364, the operator can examine in essentially real time the allocation of memory in the target system as the software is being executed.

Appearing with the memory allocation display 330 is a memory error display 370 that lists each of the memory errors found during the memory allocation analysis.

Figure 11:
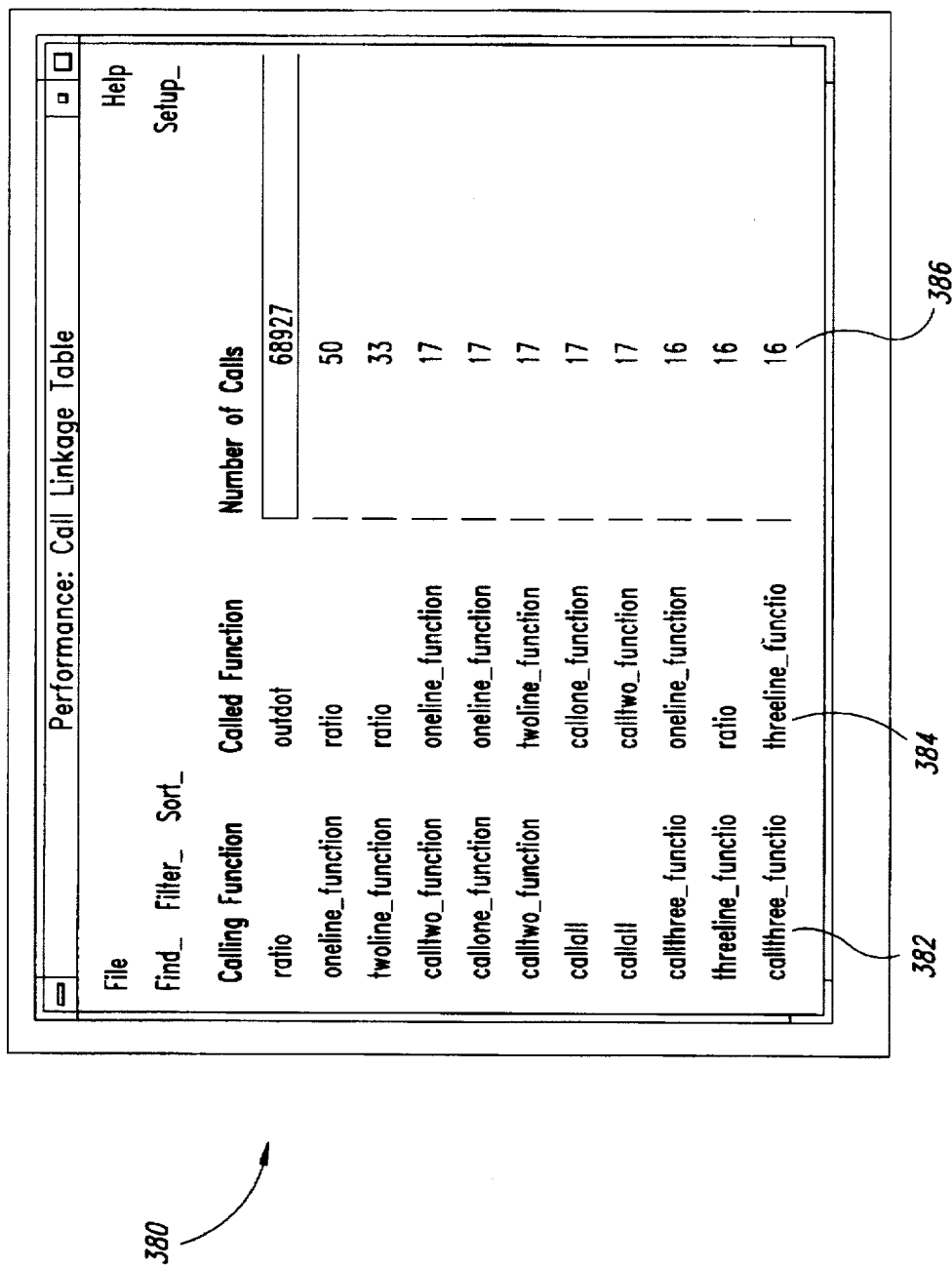
FIG. 11 is a screen display showing the results of a call linkage analysis performed by the software analysis system of FIG. 1.

An example of a call linkage table resulting from a call pair analysis is shown in FIG. 11. A call linkage display 380 dynamically tracks a number of function linkages by listing in a first column 382 the calling functions and in a second column 384 called functions. The number of times each of the calling functions has called the called function is then listed in a third column 386 in both digital and bar graph form.

Figure 12:
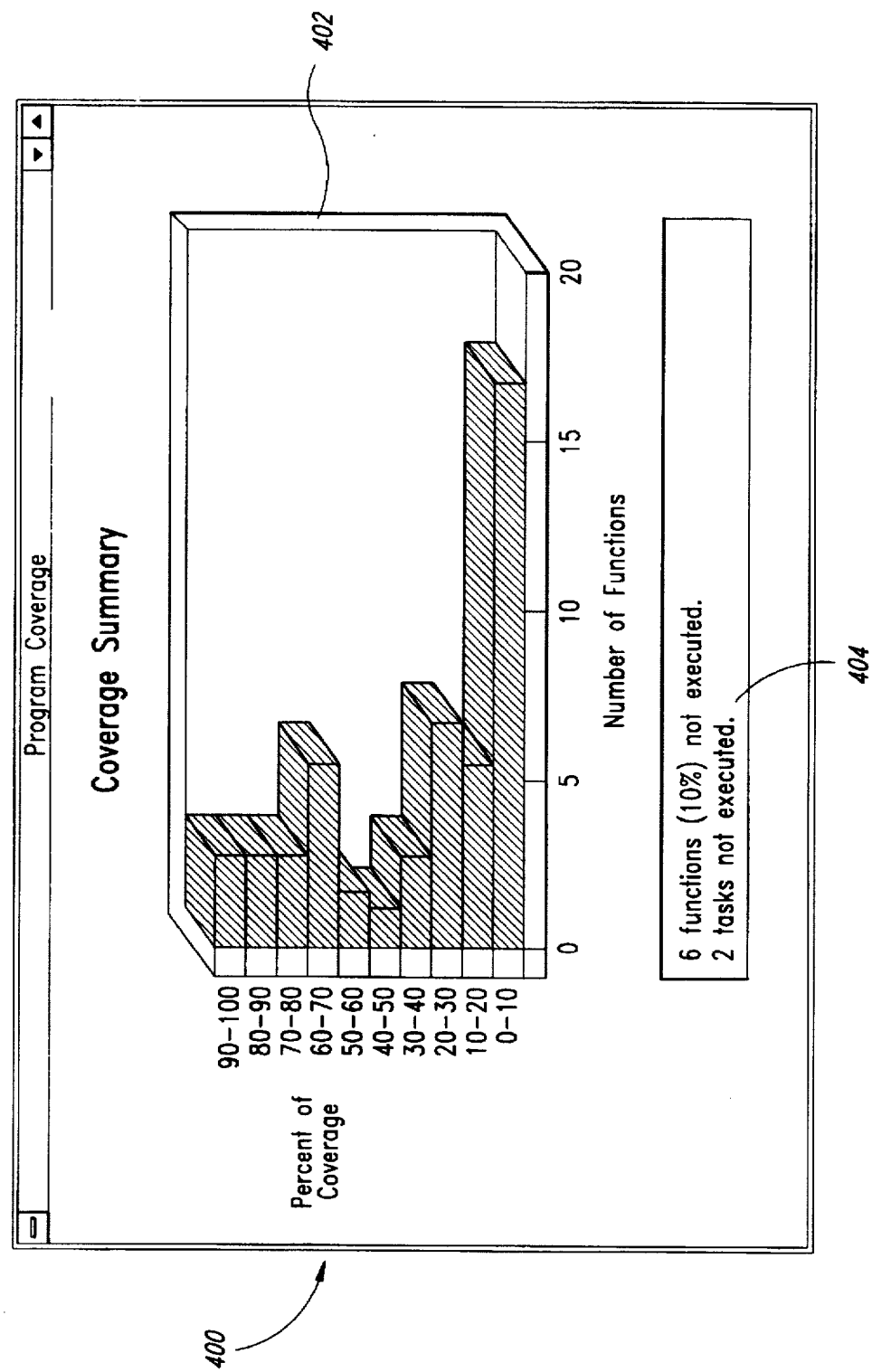
FIG. 12 is a screen display showing the results of a code coverage analysis performed by the software analysis system of FIG. 1.
Figure 13:
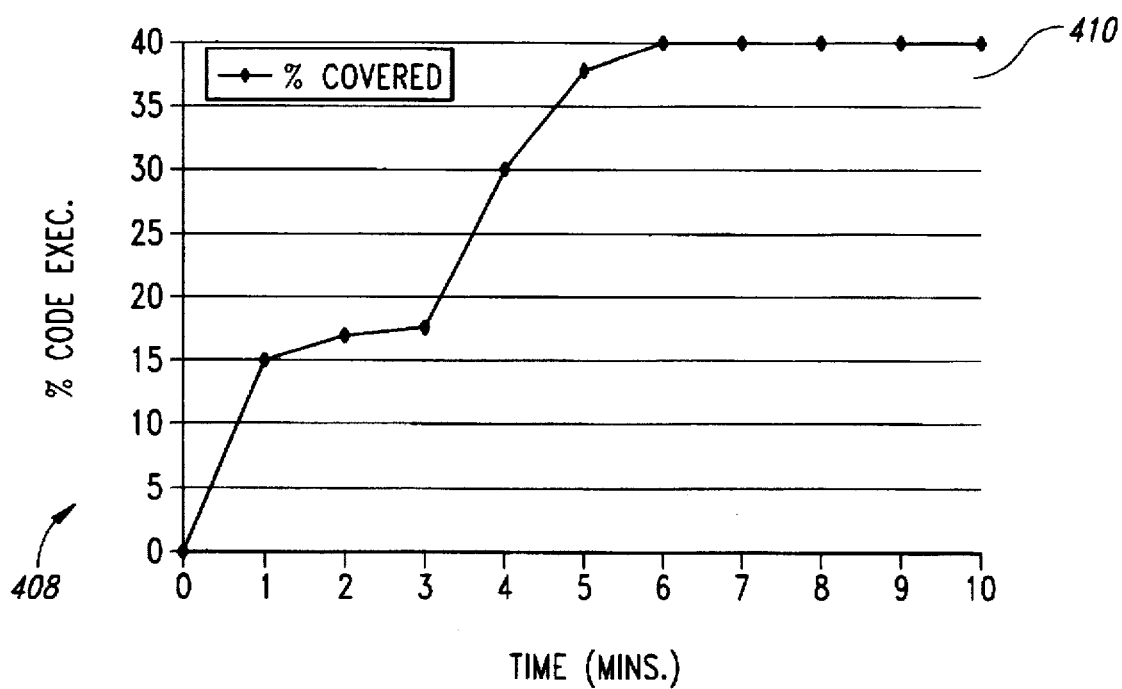
FIG. 13 is a screen display showing another presentation of the results of a code coverage analysis performed by the software analysis system of FIG. 1.

As explained above, the source code can be instrumented by placing a tag statement in each branch to assess call coverage, i.e., the number of branches executed and the frequency of execution of each branch. An example of a code coverage display 400 is illustrated h— FIG. 12. The code coverage display 400 includes a bar graph 402 showing the overall level of coverage achieved during a test. Functions are categorized in percentile ranges along the vertical axis, and the number of functions that fall within each range grouping is indicated on the horizontal axis. The total number of functions and tasks not executed are listed at the bottom of the display at 404. This listing 404 can alert the operator to portions of the software that are apparently not being executed. An alternative code coverage display 408 consists of a line graph 410 depicting the percentage of coverage achieved over the period of time conducting the test, as illustrated in FIG. 13. The code coverage graph 410 of FIG. 13 shows that 15% of the code was executed during the first minute, the rate of code coverage increased only marginally for the next two minutes, and the rate of code coverage then increased at a much faster pace for the next two minutes until leveling off at 40% coverage.

Figure 14:
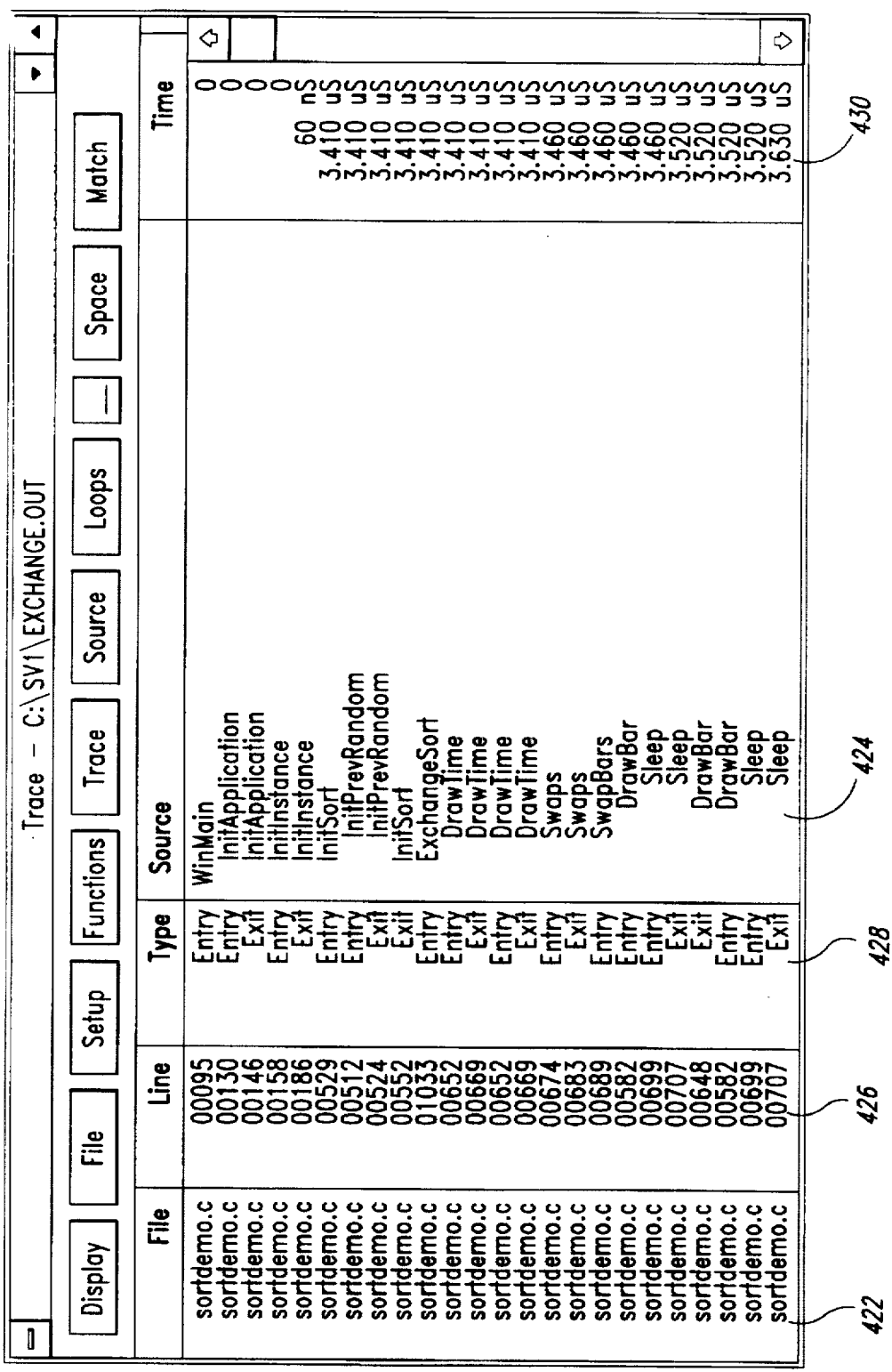
FIG. 14 is a screen display showing the results of a high level trace analysis performed by the software analysis system of FIG. 1.

The trace function as described above can be displayed in at least three different modes. A high level trace display 420 shown in FIG. 14 is preferably the default view upon entry in the trace mode. The display 420 contains a time ordered list of nested function entry and exit points and RTOS task events. The display includes a column 422 showing the source file for the software, a column 424 showing the functions in the order that they are executed, a column 426 showing a line number of that function, and a column 428 designating whether the traced function was an entry or exit point. A relative time stamp for each function is listed in a right-hand column 430. Alternatively, the results of a trace can be displayed in a control flow display 440 shown in FIG. 15. A control flow display shows time-ordered listing of all function points, executed branches and real time operating system events in the trace buffer. As with the high level display 420, the control flow display displays the source file in a first column 442, the tasks, functions, and branch points in the order that they are executed in a third column 444, whether the function is an exit point, an entry point, or a branch in column 446, and the line number of the point in column 448. As before, the right hand column 450 lists a relative time stamp for each point. Finally, the results of a trace can be displayed in a source view display 460 shown in FIG. 16. A source view display shows every line of executed software, although loops can be expanded or collapsed. The display 460 interpolates source lines which, by inference, were executed. This determination of execution is made by retrieving those source code lines which comprise the basic block in which each branch tag is located. Function entries and exits, branches, RTOS events, and other executed lines of software of interest preferably may be color coded. As with the other trace displays shown in FIGS. 14 and 15, the source view display 460 displays the source file in a first column 462, the functions in the order that they are executed in a third column 464, whether the function is an exit point, an entry point, or a branch in column 466, the line number of the point in column 468, and a relative time stamp for each point in column 470.

It will be apparent to one skilled in the art that the various analysis functions that the software analysis system 10 is capable of displaying can be presented in displays other than shown in FIGS. 9–15. Furthermore, from the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A system for analyzing software being executed in a target system having a data bus and an address bus, said software containing a plurality of executable tag statements which, when executed, cause said target system to write at least one tag to respective predetermined locations in the address space of said target system, said tags containing respective tag values corresponding to the locations in said software of tag statements generating said tags, said system comprising:

a probe connected to the address and data buses of said target system while said target system is executing said software, said probe detecting when said predetermined location in the address space of said target system is being addressed, said probe capturing a tag on the data bus of said target system when said probe detects that said predetermined location has been addressed; and a processor connected to said probe, said processor processing said tags at a rate sufficient to sustain processing said tags as they are captured while said software is being executed, said processor determining and displaying information about the execution of said software based on said tag values while said software is being executed.

2. The system of claim 1 further comprising:

a time tag generator connected to said probe, said time tag generator recording respective times when said probe captures said tags on the data bus of said target system; and wherein the processor includes a software performance analyzer determining the time required to execute said software between first and second locations based on the difference between first and second times recorded when first and second tags are captured from said data bus.

3. The system of claim 1 wherein at least some of said tags have a tag type field corresponding to an analysis function for which said tag is used, and wherein said processor includes means for processing said tags differently according to their respective analysis functions based on respective values in said tag type field regardless of the location in the address space to which said tag is written.

4. The system of claim 1, wherein at least one of said tag statements is inserted in said software at a location that will cause said tag statement to be executed along with a memory allocation statement or a library call, and wherein an executable data tag statement is inserted in said software at a location that will be executed along with said memory allocation statement, said data tag statement, when executed, causing said target system to write a data tag to a second predetermined location in the address space of said target system, said data tag containing a data value indicative of the memory being allocated by said memory allocation statement, and wherein said system further includes a memory allocation analyzer connected to said processor, said memory allocation analyzer determining the memory allocation resulting from said memory allocation statement based on the data value of said data tag captured by said probe and maintaining a running account of the memory allocated by said memory allocation statements based on the data values of respective data tags captured by said probe.

5. The system of claim 4 wherein said memory allocation analyzer further includes means for generating a graph in essentially real time of the amount of memory allocated based on said running account.

6. The system of claim 1 wherein said tag statements are inserted in said software at locations causing respective tag statements to be executed along with a plurality of function call statements, and wherein said system further includes a call pair analyzer determining which functions of said software are linked to other functions of said source code based on the order in which said probe captures said tags.

7. The system of claim 6, wherein said call pair analyzer further includes means for compiling a record of the number of times that specific called functions are called by specific calling functions.

8. The system of claim 7, wherein said call pair analyzer further includes means for compiling a statistical record of the frequency at which specific called functions are called by specific calling functions.

9. The system of claim 1 wherein said tag statements are inserted in respective branches of said software so that said tag statements will be executed along with said branches, and wherein said system further includes a code coverage analyzer determining which branches of said software have been executed based on the tag values of said tags captured by said probe.

10. The system of claim 1, wherein said processor comprises a plurality of processor devices performing different respective functions.

11. A system for analyzing software being executed in a target system having a data bus and an address bus, said software containing a plurality of executable tag statements which, when executed, cause said target system to write at least one tag to respective predetermined locations in the address space of said target system, said tags containing respective tag values corresponding to the locations in said software of tag statements generating said tags, said system comprising:

a probe connected to the address and data buses of said target system while said target system is executing said software, said probe detecting when said predetermined location in the address space of said target system is being addressed, said probe capturing a tag on the data bus of said target system when said probe detects that said predetermined location has been addressed:

a processor connected to said probe, said processor determining the software locations that have been executed based on the respective tag values of said captured tags:

a tag filter connected to said processor, said tag filter comprising:

selections means for establishing criteria for processing said tags based on their respective tag values;

comparator means for examining each tag captured by said probe to determine if said tag meets said criteria; and filter means for disregarding tags not meeting said criteria so that tags are processed by said processor only if said tags meet said criteria.

12. A system for analyzing software being executed in a target system having a data bus and an address bus, said software containing a plurality of executable tag statements which, when executed cause said target system to write at least one tag to respective predetermined locations in the address space of said target system, said tags containing respective tag values corresponding to the locations in said software of tag statements generating said tags, said system comprising:

a probe tip connected to the address and data buses of said target system while said target system is executing said software, said probe tip detecting when said predetermined location in the address space of said target system is being addressed, said probe tip capturing a tag on the data bus of said target system when said probe tip detects that said predetermined location has been addressed;

a tag preprocessor connected to said probe tip, said tag preprocessor examining said tags and, based upon the contents of said tags, routing said tags to a first output if said tags are being used for a code coverage analysis and routing said tags to a second output if said tags are not being used for a code coverage analysis;

a code coverage data reduction processor and data base connected to the first output of said tag preprocessor;

a tag buffer connected to the second output of said tag preprocessor, said tag buffer storing and then outputting tags received from the second output of said tag preprocessor and a processor receiving the tags from the tag buffer, said processor determining the source code locations that have been executed based on the respective tag values of said tags.

13. A method of analyzing software being executed in a target system having a data bus and an address bus, said method comprising the steps of:

inserting a plurality of executable tag statements at locations in said software, each of said tag statements, when executed, causing said target system to write a tag to a predetermined location in the address space of said target system, said tags containing respective tag values corresponding the locations in said software of tag statements generating said tags;

allowing said target system to execute said software;

monitoring the address and data buses of said target system while said target system is executing said software;

detecting when said predetermined location in the address space of said target system is being addressed;

capturing a tag on said data bus when addressing of said predetermined location is detected;

determining information about the execution of said software based on said tag values while said software is being executed: and displaying information about the execution of said software based on said determination while said software is being executed.

14. The method of claim 13 further including the steps of:

recording a first time when a first tag is present on said data bus; said first tag having a first tag value corresponding to a first location in said software of a first tag statement generating said first tag;

recording a second time when a second tag is present on said data bus; said second tag having a second tag value corresponding to a second location in said software of a second tag statement generating said second tag; and based on the difference between said first and second times, determining the time required to execute said software between said first and second locations.

15. The method of claim 13 wherein at least some of said tag statements, when executed, cause said target system to write a tag to a predetermined location in the address space of said target system having a tag type field corresponding to an analysis function of said tag so that different tags may be processed differently according to their respective analysis functions.

16. The method of claim 13, wherein at least one of said tag statements is inserted in said software at a location that will cause said tag statement to be executed along with a memory allocation statement or a library call, and wherein said method further comprises the steps of:

inserting an executable data tag statement in said software at a location that will be executed along with said memory allocation statement, said data tag statement, when executed, causing said target system to write a data tag to a second predetermined location in the address space of said target system, said data tag containing a data value indicative of a characteristic of the memory being allocated by said memory allocation statement;

detecting when said second predetermined location in the address space of said target system is being addressed;

capturing a data tag on said data bus when addressing of said second predetermined location is detected; and determining the memory allocation resulting from said memory allocation statement based on the data value of said captured data tag.

17. The method of claim 16 further including the step of placing data tag statements in software locations so that a data tag statement will be executed with the execution of each memory allocation statement, and wherein said method further includes the step of maintaining a running account of the memory allocated by said memory allocation statements based on the data values of respective captured data tags.

18. The method of claim 17 further including the step of generating a graph in essentially real time of the amount of memory allocated based on said running account.

19. The method of claim 16, wherein the data value contained in said data tag provides an indication of the size of a block of memory being allocated.

20. The method of claim 16, wherein the data value contained in said data tag provides an indication of the type of said memory allocation statement.

21. The method of claim 16, wherein the data value contained in said data tag provides an indication of an erroneous memory allocation.

22. The method of claim 16, wherein the data value contained in said data tag provides an indication of the size of a block of memory being allocated.

23. The method of claim 16, wherein the data value contained in said data tag provides an indication of the address of the memory being allocated by said memory allocation statement in said software.

24. The method of claim 13, further including the steps of:
inserting tag statements in said software at locations causing respective tag statements to be executed along with a plurality of function call statements; and
based on the order in which said tags are captured when addressing of said predetermined location is detected, determining which functions of said software are linked to other functions of said software.

25. The method of claim 24, further including the step of compiling a record of the number of times that specific called functions are called by specific calling functions.

26. The method of claim 24, further including the step of compiling a statistical record of the frequency at which specific called functions are called by specific calling functions.

27. The method of claim 13, further including the steps of:
inserting tag statements in respective branches of said software so that said tag statements will be executed along with said branches; and
based on the tag values of said tags captured when addressing of said predetermined location is detected, determining which branches of said software have been executed.

28. The method of claim 13 wherein said tags may be either control tags or data tags, said control tags including a field having a tag value corresponding to the software location of a control tag statement generating said control tag, said data tags being associated with a respective control tag and having a data field that provides information about an event identified by the control tag with which said data tag is associated.

29. The method of claim 13 wherein said method further includes the step of determining an execution context from a record of the source code locations that have been executed by said target system, the execution context being determined while said software is being executed.

30. The method of claim 29, further including the step of using said execution context determination to control the progress of said analysis, while said software is being executed.

31. The method of claim 29 wherein said tags are used to produce a task performance analysis.

32. The method of claim 29 wherein said step of determining an execution context comprises determining a task context from a record of the source code locations that have been executed by said target system, the execution context being determined while said software is being executed.

33. The method of claim 29 wherein said step of determining an execution context comprises determining a function nesting hierarchy from a record of the source code locations that have been executed by said target system, the nesting hierarchy being determined while said software is being executed.

34. The method of claim 13 wherein said tag statements are inserted in the source code of said software, and wherein said method further includes the steps of compiling said source code and inserted tag statements to obtain object code, and executing said object code in said target system.

35. A method of analyzing software being executed in a target system having a data bus and an address bus, said method comprising the steps of:
inserting a plurality of executable tag statements at locations in said software, each of said tag statements, when executed, causing said target system to write a tag to a predetermined location in the address space of said target system, said tags containing respective tag values corresponding to the locations in said software of tag statements generating said tags;
allowing said target system to execute said software;
monitoring the address and data buses of said target system while said target system is executing said software;
detecting when said predetermined location in the address space of said target system is being addressed;
capturing a tag on said data bus when addressing of said predetermined location is detected;
establishing criteria for processing said tags based on their respective tag values;
examining each captured tag to determine if said tag meets said criteria; and
subsequently processing and displaying respective software locations that have been executed based on said tags only if said tags meet said criteria, thereby filtering said tags after said tags have been captured.

36. A system for determining and displaying the context of software being executed in a target system having a data bus and an address bus, said software containing a plurality of executable tag statements which, when executed, cause said target system to write a plurality of tags to at least one location in the address space of said target system, said tags containing respective tag values corresponding to the locations in said software of respective tag statements generating said tags, said system comprising:
a probe connected to the address and data buses of said target system while said target system is executing said software, said probe capturing tags on the data bus of said target system when said tag statements generating said tags are executed; and
a processor connected to said probe, said processor determining the software locations that have been executed based on the respective tag values of said captured tags while said software is being executed by said target system, said processor determining and displaying the context of said software currently being executed by said target system.

37. The system of claim 36 wherein said processor further determines a duration that said software is executing a function for each of a plurality of tasks calling said function.

38. The system of claim 36 wherein said processor further detects when said software is performing a function in one of a plurality of tasks calling said function and alters its performance in response thereto.

39. The system of claim 38 wherein said processor traces the execution of said software only when said processor detects that said software is performing the function in the one of a plurality of tasks calling said function.

40. The system of claim 38 wherein said processor determines a characteristic of the memory being allocated in said target system only when said processor detects that said software is executing the function in the one of a plurality of tasks calling said function.

41. A system for determining and displaying the coverage of software being executed in a target system having a data bus and an address bus, said software containing a plurality of executable tag statements which, when executed, cause said target system to write a plurality of tags to at least one location in the address space of said target system, said tags containing respective tag values corresponding to the locations in said software of respective tag statements generating said tags, said system comprising:

a probe connected to the address and data buses of said target system while said target system is executing said software, said probe capturing tags on the data bus of said target system when said tag statements generating said tags are executed; and a processor connected to said probe, said processor determining the software locations that have been executed based on the respective tag values of said captured tags while said software is being executed by said target system, said processor maintaining a database indicative of the execution of portions of said software while said software is being executed, said database listing each of said software portions and the numbers of respective times that said software portions have been executed.

42. A method of determining and displaying the context of software being executed in a target system having a data bus and an address bus, comprising the steps of:

inserting a plurality of executable tag statements at locations in said software which, when executed, cause said target system to write a plurality of tags to at least one location in the address space of said target system, said tags containing respective tag values corresponding to the locations in said software of respective tag statements generating said tags;

allowing said target system to execute said software;

monitoring the data bus of said target system while said target system is executing said software;

capturing tags on said data bus when said tag statements generating said tags are executed;

determining the software locations that have been executed based on the respective tag values of said captured tags while said software is being executed by said target system; and determining and displaying the context of said software currently being executed by said target system.

43. The method of claim 42 wherein said method further comprises the step of determining the duration that said software is performing a function for each of a plurality of tasks calling said function.

44. The method of claim 42 wherein said method further comprises the steps of detecting when said software is performing a function in one of a plurality of tasks calling said function and, in response thereto, tracing the execution of said software.

45. The method of claim 42 wherein said method further comprises the steps of detecting when said software is performing a function in one of a plurality of tasks calling said function and, in response thereto, determining a characteristic of the memory being allocated in said target system.

46. A method of determining and displaying the coverage of software being executed in a target system having a data bus and an address bus, comprising:

inserting a plurality of executable tag statements at locations in said software which, when executed, cause said target system to write a plurality of tags to at least one location in the address space of said target system, said tags containing respective tag values corresponding to the locations in said software of respective tag statements generating said tags;

allowing said target system to execute said software;

monitoring the data bus of said target system while said target system is executing said software;

capturing tags on said data bus when said tag statements generating said tags are executed;

determining the software locations that have been executed based on the respective tag values of said captured tags while said software is being executed by said target system; and maintaining a database indicative of the execution of portions of said software while said software is being executed, said database listing each of said software portions and the numbers of respective times that said software portions have been executed.

* * * * *